(12) United States Patent
Naini et al.

(10) Patent No.: US 11,161,052 B2
(45) Date of Patent: Nov. 2, 2021

(54) MODELING DEVICE, METHOD, AND SYSTEM

(71) Applicants: Jordan Naini, Bellevue, WA (US); Ali Naini, Bellevue, WA (US)

(72) Inventors: Jordan Naini, Bellevue, WA (US); Ali Naini, Bellevue, WA (US)

(\*) Notice: Subject to any disclaimer, the term of this patent is extended or adjusted under 35 U.S.C. 154(b) by 0 days.

(21) Appl. No.: 15/836,707

(22) Filed: Dec. 8, 2017

(65) Prior Publication Data
US 2018/0161687 A1 Jun. 14, 2018

Related U.S. Application Data

(60) Provisional application No. 62/432,437, filed on Dec. 9, 2016.

(51) Int. Cl.
*A63H 33/04* (2006.01)
*G09B 23/26* (2006.01)
*A63H 33/08* (2006.01)
*A63H 33/06* (2006.01)
*A63H 33/26* (2006.01)

(52) U.S. Cl.
CPC ......... *A63H 33/046* (2013.01); *A63H 33/042* (2013.01); *A63H 33/06* (2013.01); *A63H 33/086* (2013.01); *A63H 33/088* (2013.01); *A63H 33/26* (2013.01); *G09B 23/26* (2013.01)

(58) Field of Classification Search
CPC .... A63H 33/042; A63H 33/046; A63H 33/06; A63H 33/086; A63H 33/088; A63H 33/26; G09B 23/26
USPC .................................................. 446/92, 102
See application file for complete search history.

(56) References Cited

U.S. PATENT DOCUMENTS

| | | | | |
|---|---|---|---|---|
| 2,308,402 A | * | 1/1943 | Taylor | G09B 23/26 434/278 |
| 2,362,064 A | * | 11/1944 | Giesinger | A63B 43/002 473/595 |
| 3,170,246 A | | 2/1965 | Koltun | |

(Continued)

OTHER PUBLICATIONS

Robert B. Corey and Linus Pauling, The Review of Scientific Instruments, vol. 24, No. 8, pp. 621-627, Molecular Models of Amino Acids, Peptides, and Proteins (Aug. 25, 1952, Pasadena, California, U.S.A.).

*Primary Examiner* — Joseph B Baldori
(74) *Attorney, Agent, or Firm* — Nima Seyedali

(57) ABSTRACT

The present disclosure provides a modeling apparatus having a plurality of modeling devices, each having a generally tetrahedron shape having four faces with an interface element attached to each face. Each interface element cane b removably and rotatably coupled to an interface element of an adjacent modeling device. A combination of modeling devices are selectively couplable to form a variety of structures such as molecular, architectural, artistic, dynamic, and/or any other suitable model. The interface elements can include magnets with distinct or identical polarities, and with selective strengths to emulate the target structure or assembly attributes. They can also be iron or a neutral material such as aluminum. The vertices of the modeling apparatus include a curvilinear boundary tracing a spherical periphery of a sphere having a radius extending from a center point of the tetrahedral shape to a midpoint of an edge thereof.

8 Claims, 20 Drawing Sheets

(56) References Cited

U.S. PATENT DOCUMENTS

| | | | | |
|---|---|---|---|---|
| 3,524,267 A * | 8/1970 | Barrett | G09B 23/26 | 434/278 |
| 3,604,130 A * | 9/1971 | Forsstrom | G09B 23/26 | 434/278 |
| 3,659,360 A * | 5/1972 | Zeischegg | G09B 23/04 | 434/403 |
| 4,007,392 A * | 2/1977 | Valfells | H05H 1/10 | 313/154 |
| 4,238,905 A * | 12/1980 | MacGraw, II | A63H 33/046 | 446/92 |
| 4,461,480 A * | 7/1984 | Mitchell | A63F 9/0826 | 273/153 S |
| 5,746,638 A * | 5/1998 | Shiraishi | A63H 33/046 | 446/131 |
| 5,947,745 A * | 9/1999 | Tempelman | G09B 23/20 | 434/278 |
| 5,957,452 A * | 9/1999 | Patton | A63F 9/0415 | 273/146 |
| 6,017,220 A * | 1/2000 | Snelson | A63H 33/046 | 434/211 |
| 6,116,979 A | 9/2000 | Weber | | |
| 6,152,797 A | 11/2000 | David | | |
| 6,749,480 B1 * | 6/2004 | Hunts | A63H 33/046 | 446/85 |
| 7,247,075 B2 | 7/2007 | Von Oech | | |
| 7,465,169 B2 * | 12/2008 | Roth | G09B 23/26 | 434/278 |
| D618,738 S * | 6/2010 | Bodin | D21/505 | |
| D627,825 S * | 11/2010 | Logan | A63H 33/046 | D19/59 |
| D633,144 S * | 2/2011 | Logan | D19/62 | |
| 8,141,876 B2 | 3/2012 | Humphreys et al. | | |
| 8,157,608 B1 | 4/2012 | Stapleton | | |
| 8,851,953 B2 * | 10/2014 | Oschuetz | A63H 33/042 | 446/124 |
| 10,497,283 B2 * | 12/2019 | Fekl | G09B 23/26 | |
| 2005/0014112 A1 | 1/2005 | Fentress | | |
| 2005/0248090 A1 | 11/2005 | Anders | | |
| 2006/0099877 A1 * | 5/2006 | Anderson | G09B 23/26 | 446/92 |
| 2008/0099877 A1 * | 5/2008 | Daubenspeck | H01L 23/5254 | 257/529 |
| 2009/0309302 A1 | 12/2009 | Langlin-Hooper | | |
| 2013/0012098 A1 * | 1/2013 | Meys | A63H 33/062 | 446/85 |
| 2014/0213139 A1 | 7/2014 | Ferguson | | |

* cited by examiner

MODELING DEVICE, METHOD, AND SYSTEM

BACKGROUND

Technical Field

The present disclosure generally relates to modeling devices, and more particularly, to a modeling system and parts that facilitate molecular, artistic, dynamic, and/or structural modeling, and are versatile to compose various shapes in fixed or relative motion configurations.

Description of the Related Art

Scientists and lay individuals alike, whether for fun or research, arrange a number of pieces to compose an assembly resembling a shape, a particular organic or inorganic structure, buildings, landscapes, various molecules, and/or any other suitable or desired structure. The traditional modeling systems for schools and labs include balls and sticks, which of course can be assembled to display only a symbolic representation of molecules. In addition, they are limited in application for molecular representations and do not serve any other aesthetic, functional, or structural utility.

Although other building blocks have been introduced, deviating from the traditional ball and stick models, they continue to have drawbacks not addressed by the current state of the art. For example, where shapes such as pyramids are used, the blocks are severely constrained to a limited array of structural assemblies because of unavoidable collisions between the protruding pyramid corners that greatly restrict and do not allow unimpeded rotation. Where instead of sticks, magnets are used for binding the blocks, the shape of the blocks as well as the magnetic polarity and binding are not permutated or modulated to allow an array of different bonding attributes of the blocks to emulate coupling strength of the target structure which the building block assembly is intended to emulate.

Another existing device provides a modular toy where each building block has a strict tetrahedron shape that is not truncated and has protruding vertices. However, the strict geometric shape of the blocks allows only a limited number of rigid assemblies, which in turn fail to facilitate versatility to emulate generally curvilinear structures, organic shapes, dynamic assemblies in which the blocks can move with respect to one another or cause a ripple effect or repeating pattern motion, or to display accurate molecular bonding, among other limitations.

Other modeling solutions have employed bipolar magnets forming the entirety of each building block where the magnets can bind to each other in chains without allowing the user to produce three-dimensional arrays. These assemblies therefore fail to achieve high resolution three-dimensional matrix binding or other features of target real life structures or specific applications. Furthermore, because of collision between the vertices, such solutions fail to facilitate stable assemblies or assemblies in which the blocks can move with respect to one another or cause a ripple effect or repeating pattern motion and accurate molecular bonding, among other applications Therefore, existing devices fail to achieve a desired degree of functional and structural versatility and completely fail to provide a solution for dynamic assemblies allowing for continuous actuated motion or ripple effects. Existing devices are severely constrained in their repertoire of assembled shapes, inherent strength, ease of assembly and combinatorial potential. Therefore, such devices do not achieve a heightened emulation or simulation of structures or models in teaching, research, architecture, artwork and toys, as well as in creating other useful structures where light weight, high load bearing, and rapid and versatile assembly-disassembly is desired.

BRIEF SUMMARY

According to one embodiment, a modeling apparatus includes a plurality of modeling devices, each modeling device including a tetrahedral shape having four faces and four vertices, each face having a central region, each vertex having a curvilinear boundary; and at least four linking members, at least one linking member being coupled to each face of the modeling device toward the central region thereof, at least some of the respective linking members removably and rotatably coupling the modeling devices to at least one other modeling device.

In one aspect, each of the linking members on each face includes at least one of a positively charged magnet adapted to bind to a negatively charged magnet and iron; a negatively charged magnet adapted to bind to a positively charged magnet and iron; iron configured to bind to a positively charged magnet and a negatively charged magnet; and a neutral material precluding any binding with positively charged magnets, negatively charged magnets, and iron.

In one aspect, at least one of the linking members includes a magnetic device exerting a force perpendicular to the corresponding face to which the magnetic device is coupled.

In one aspect, the force of each magnetic device has a magnitude, the magnitude of the force of at least two of the magnetic devices varying from each other.

In one aspect, each modeling device includes a volume having a center and each linking member includes a midpoint, and an angle defined between two axes extending from the midpoint of any two linking members on the corresponding faces extending to the center of the volume of the modeling device is approximately 109.47 degrees.

In one aspect, rotation of one modeling device imparts motion to at least some of the other modeling devices.

In one aspect, the plurality of modeling devices being coupled and forming a first unitary body, are selectively movable between a first relational arrangement between the modeling devices, and a second relational arrangement therebetween while at least some of the modeling devices remain coupled and the modeling apparatus transitions to a second unitary body.

In one aspect, the linking members include a magnetic device exhibiting a magnetic force, each magnetic force of the respective magnetic devices having a selective magnitude, at least two of the selective magnitudes being different from each other.

In one aspect, at least two of the modeling devices have distinct sizes and/or distinct colors, and/or distinct other attribute.

In one aspect, the linking members include at least one protrusion and at least one cavity configured to be coupled to the protrusion.

In one aspect, the apparatus further includes, an actuating device operatively coupled to at least one of the modeling devices and configured to impart motion thereto.

In one aspect, the curvilinear boundary of each vertex follows a spherical periphery of a sphere having a radius extending from a center point of the tetrahedral shape to a midpoint of an edge thereof.

In one aspect, at least two of the faces are substantially contiguous along a region approaching the midpoint of the corresponding edge.

In one aspect, the coupled modeling devices are selectively rotatable with respect to one another while at least some of the modeling devices remain coupled and the modeling apparatus remains unitary.

In one aspect, the plurality of modeling devices include at least a first and a second group of modeling devices, each group having a distinct attribute, the first and second group being selectively coupleable to exhibit a first relational arrangement between the first and second group, and be manipulable to movably rearrange into a second relational arrangement therebetween while at least some of the modeling devices remain coupled and the modeling apparatus remains unitary.

According to one embodiment, a modeling apparatus includes a plurality of form factors, each form factor having a volume including a center and a plurality of edges, each form factor including a spherical truncated tetrahedral shape having four faces and four vertices, each vertex truncated with a spherical boundary, the spherical boundary being defined by a sphere having a radius extending from the center of the volume to a midpoint of one of the edges thereof; and at least four interface elements, each interface element attached to a respective face of the form factor, at least some of the interface elements adapted to be coupled to at least some of the interface elements of adjacent form factors, thereby coupling adjacent form factors, the plurality of coupled form factors capable of rotating with respect to adjacently coupled form factors, the spherically truncated vertices of each form factor clearing the spherically truncated vertices of adjacent form factors as they rotate with respect to each other.

In one aspect, at least some of the interface elements include a magnet configured to exert a force, each magnet being attached to the corresponding face such that the force acts in a direction perpendicular to the corresponding face.

In one aspect, the plurality of form factors are coupled and form a first unitary body, the form factors being selectively movable with respect to adjacent form factors, between a first relational arrangement between the form factors, and a second relational arrangement therebetween while at least some of the form factors remain coupled and the modeling apparatus transitions to a second unitary body.

In one aspect, the plurality of form factors are divided into at least a first and a second group of form factors, each group having a distinct attribute, the first and second group being manipulable to transition from a first relational arrangement between the first and second groups, to a second relational arrangement therebetween while at least some of the modeling devices remain coupled and the modeling apparatus remains unitary.

DETAILED DESCRIPTION

Figure 1:
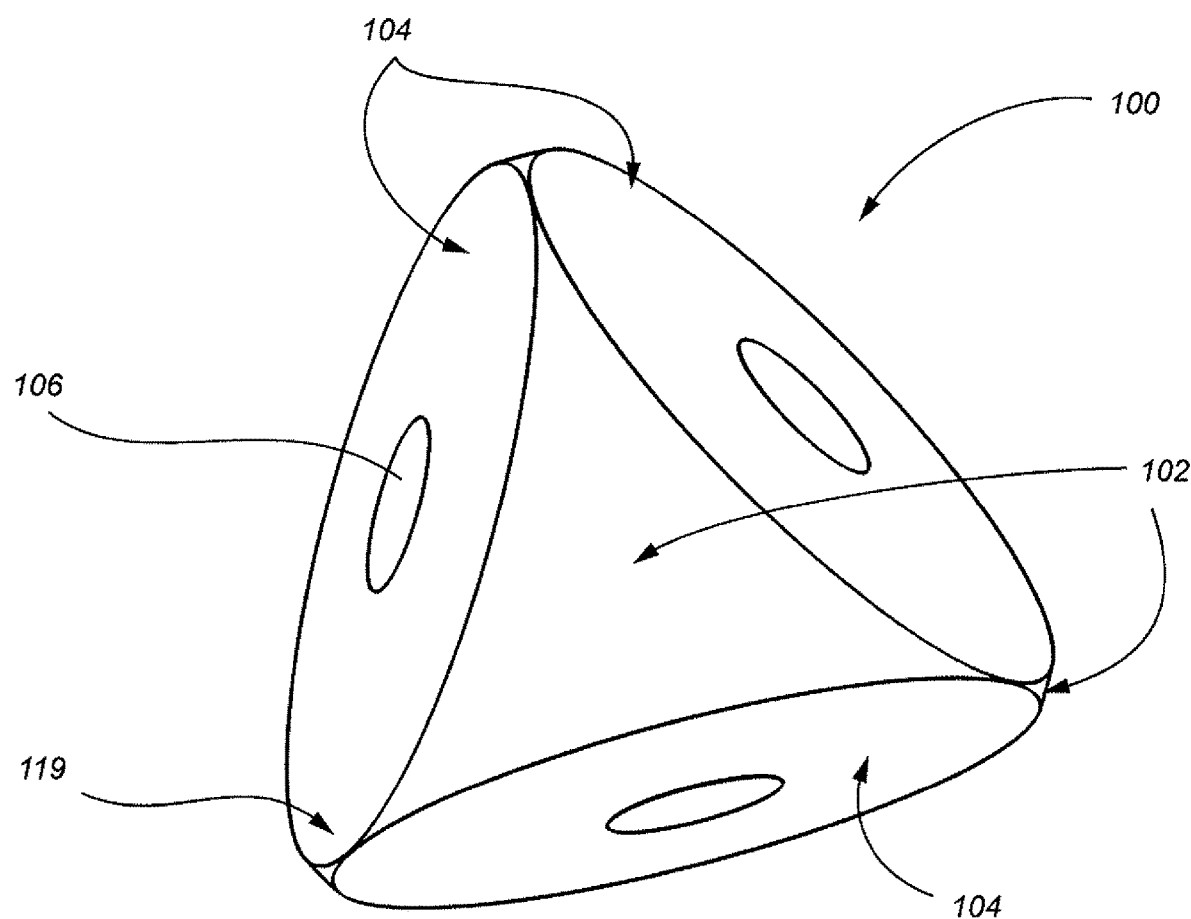
FIG. 1 illustrates an isometric view of a modeling device according to one embodiment.

According to one embodiment as illustrated in FIG. 1, a modeling device 100 includes a form factor having a generally tetrahedral shape having four generally curvilinear corners or vertices 102 and four faces 104, each face 104 being coupled to a linkage member 106. In some embodiments, the face 104 can be substantially flat. In some embodiments, the generally curvilinear vertices 102 can be formed via a spherical truncation of a tetrahedron. In some embodiments, the linkage member 106 can include a magnetic device or magnet. Throughout this disclosure, the linkage member 106 is referred to as magnet 106 for clarity of description and without any intention to limit the general broader scope of the present disclosure. Throughout this disclosure where tetrahedron or tetrahedral modeling devices are referred to, the intention is to refer to the curvilineal or spherically truncated tetrahedral modeling device 102.

In some embodiments, the magnet 106 can be substantially flush with the corresponding face 104 to which the magnet 106 is attached or coupled. In other embodiments, at least some of the magnets 106 can extend beyond the face 104, or be recessed therein.

In one aspect, the magnet 106 can be of a first polarity or a second polarity. In various embodiments, the specific polarity of each magnet 106 or the respective polarity of the plurality of magnets 106 in a modeling device 100 can vary to bring about desired results.

In various embodiments, positioning the magnets 106 and a shape thereof can contribute to the utility of an assembly comprised of a plurality of modeling devices 100.

Figure 2:
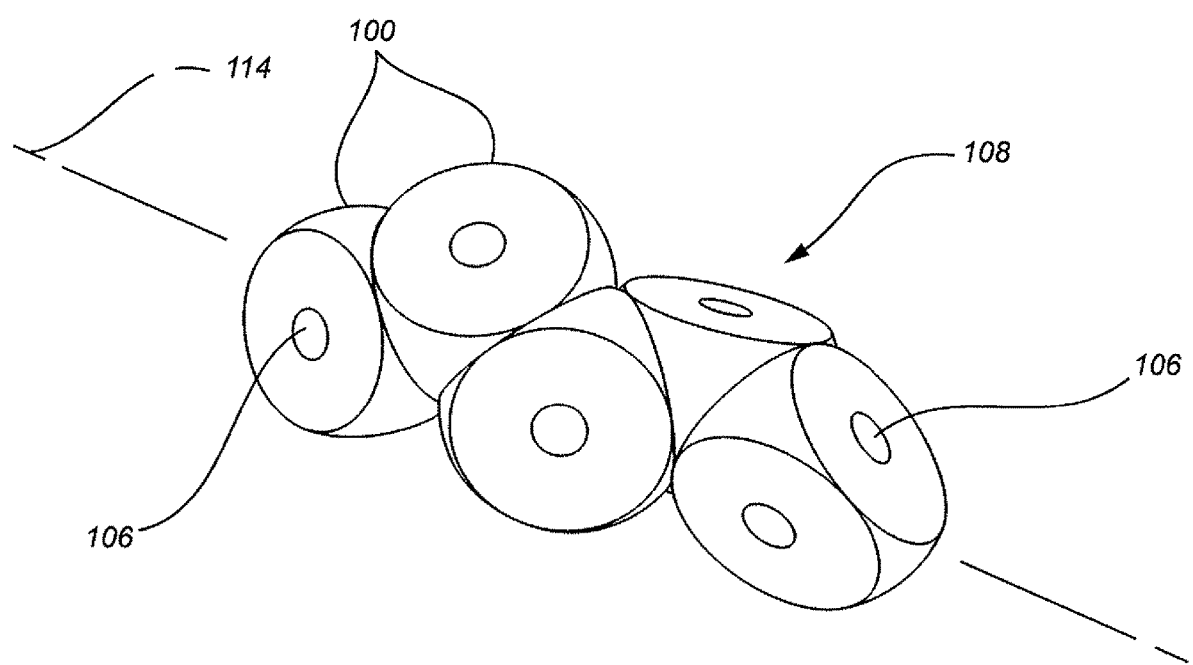
FIG. 2 illustrates an isometric view of a modeling apparatus including a plurality of modeling devices in a first configuration according to one embodiment.

For example, in one embodiment as illustrated in FIG. 2, a modeling apparatus 108 includes a plurality of modeling devices 100 configured to be selectively arranged and/or coupled with respect to one another, forming a desired model and/or structure or a first unitary body, including but not limited to, chemical models, architectural models, toy building blocks, artwork, sculptures, and/or any combination thereof or any other suitable form factor.

In some embodiments, the polarity of the respective magnets 106 could determine the binding properties of the respective modeling devices 100, for example, in substantially the same manner binding properties of different atomic elements determine their capability to associate with each other and other atoms. Therefore, in certain embodiments, a collection of the truncated tetrahedral modeling devices 100, all of which have four surfaces containing positive polarity magnets 106, would be self-repelling, generally akin to a collection of approximately unipolar magnets. In some embodiments, a collection of truncated tetrahedral modeling devices 100 having all four surfaces containing negative polarity magnets would also be self-repelling.

In embodiments of the apparatus 108 in which a plurality of all-positive-polarity and all-negative-polarity truncated tetrahedrons are combined, they could bind to each other in an alternating three-dimensional array.

Figure 8:
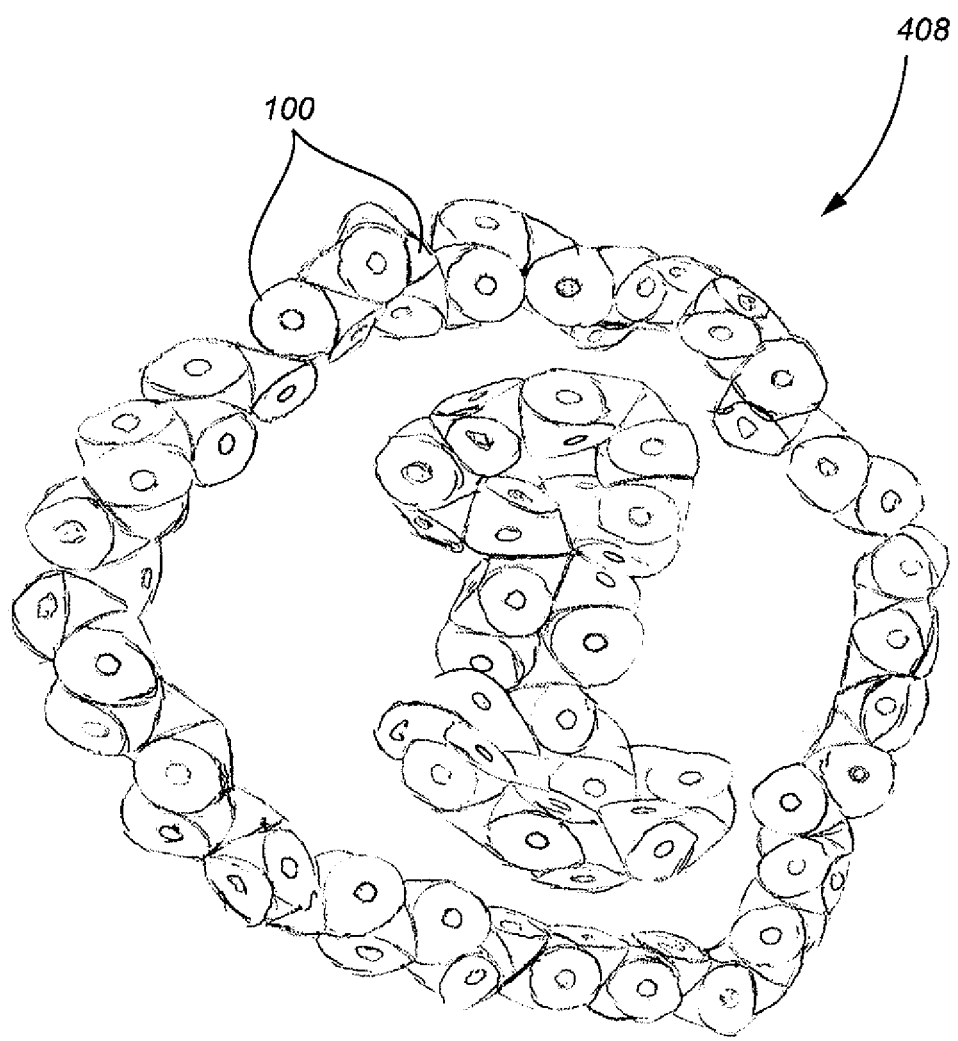
FIG. 8 illustrates an isometric plan view of two modeling apparatus each including a plurality of modeling devices generally resembling an organic chain or abstract form factors according to one embodiment.
Figure 9:
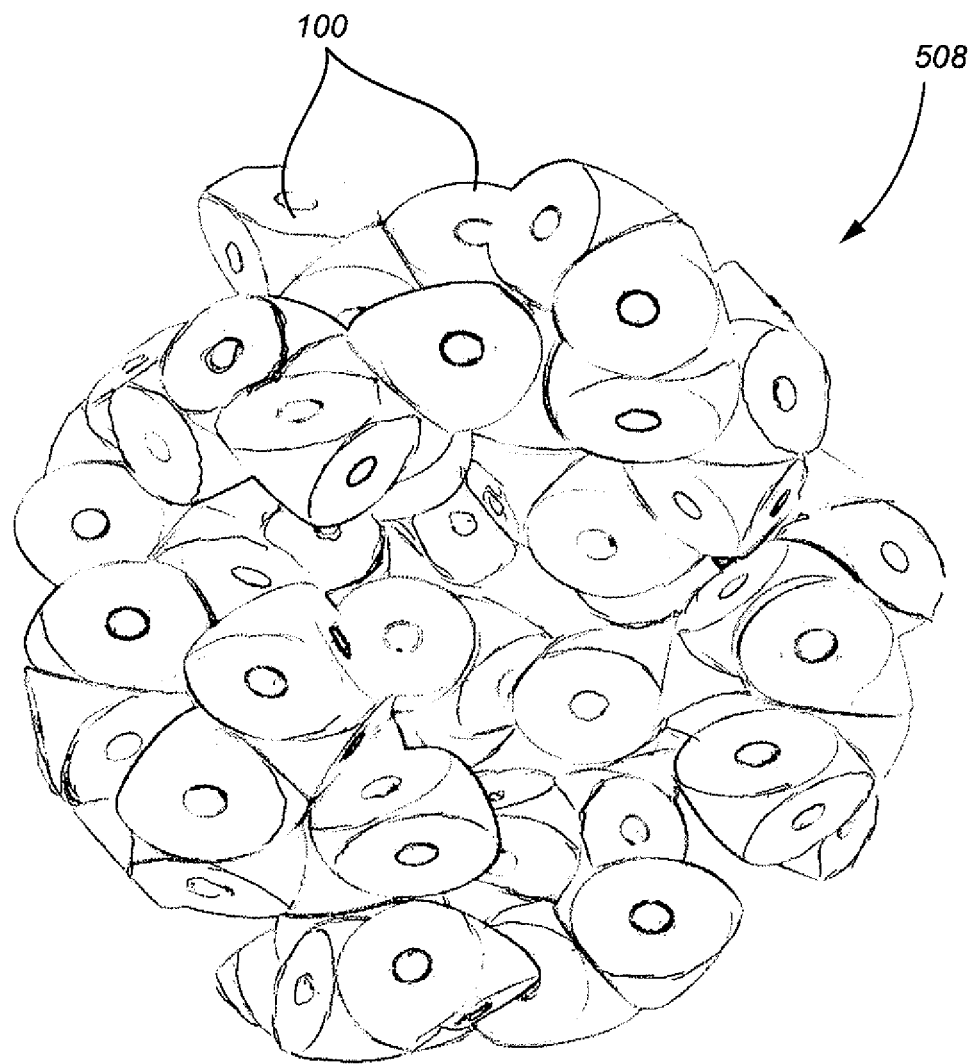
FIG. 9 illustrates an isometric view of a modeling apparatus including a plurality of modeling devices molded in an abstract form factor according to one embodiment.

In yet another embodiment, in which a plurality of modeling devices 100 each include three positive polarity magnets 106 and one negative polarity magnet 106, the apparatus 108 could form a concatenated, branching or chain like structure as illustrated in FIGS. 8 and 9. In still another embodiment, the modeling apparatus 108 can include at least some modeling devices 100 having three negative polarity magnets 106 and one positive polarity magnet 106. In another embodiment, the apparatus 108 could include at least some modeling devices 100 having two negative polarity magnets 106 and two positive polarity magnets 106.

In some embodiments, the modeling devices 100 can be color coded to signal their polarity permutation. For example, Table 1 below identifies one possible color and polarity combination for a set of modeling devices 100.

TABLE 1

| Example Color Scheme | | | | |
|---|---|---|---|---|
| Red | Iron | Iron | Iron | Iron |
| Yellow | Negative | Negative | Negative | Negative |
| Orange | Positive | Negative | Negative | Negative |
| Green | Positive | Positive | Negative | Negative |
| Purple | Positive | Positive | Positive | Negative |
| Blue | Positive | Positive | Positive | Positive |

LEGEND
Positive: Binds to negative, repels positive
Negative: Binds to positive, repels negative
Iron: Binds to positive and negative
Neutral Material (e.g.) Aluminum): No binding Some embodiments can incorporate a magnetically attractable material, such as iron, and/or a neutral or magnetically benign material, such as aluminum or plastic. Iron binds to either polarity magnets, therefore, in a mixed polarity apparatus 108, iron can be incorporated in faces 104 or modeling devices 100 where the user desires those faces 104 or modeling devices 100 to bind to adjacent modeling devices 100 having various polarity combinations. In contrast, aluminum can be incorporated where the user desires no bonding. With such various combinations, students, architects, engineers, teachers, and scientists alike can model and emulate various molecular and structural models embodying these relationships at connections between their respective building blocks.

In addition, or instead, different polarity magnets may take distinct shapes, for example complementary shapes. For example, positive polarity magnets can be spherical or semispherical convex shaped extending beyond the corresponding face 104, and negative polarity magnets can be semispherical convex shaped recessed into the corresponding face 104.

Table 2 below lists a number of various types of modeling devices 100 with various possible combination of mixed polarity magnets, iron, and a neutral material, for example, aluminum.

TABLE 2

| Type# | Positive | Negative | Iron | Aluminum |
|---|---|---|---|---|
| 1 | 4 | 0 | 0 | 0 |
| 2 | 3 | 1 | 0 | 0 |
| 3 | 3 | 0 | 1 | 0 |
| 4 | 3 | 0 | 0 | 1 |
| 5 | 2 | 2 | 0 | 0 |
| 6 | 2 | 0 | 2 | 0 |
| 7 | 2 | 0 | 0 | 2 |
| 8 | 2 | 1 | 1 | 0 |
| 9 | 2 | 0 | 1 | 1 |
| 10 | 2 | 1 | 0 | 1 |
| 11 | 1 | 3 | 0 | 0 |
| 12 | 1 | 0 | 3 | 0 |
| 13 | 1 | 0 | 0 | 3 |
| 14 | 1 | 2 | 1 | 0 |
| 15 | 1 | 2 | 0 | 1 |
| 16 | 1 | 1 | 2 | 0 |
| 17 | 1 | 0 | 2 | 1 |
| 18 | 1 | 1 | 0 | 2 |
| 19 | 1 | 0 | 1 | 2 |
| 20 | 1 | 1 | 1 | 1 |
| 21 | 0 | 4 | 0 | 0 |
| 22 | 0 | 3 | 1 | 0 |
| 23 | 0 | 3 | 0 | 1 |
| 24 | 0 | 2 | 2 | 0 |
| 25 | 0 | 2 | 0 | 2 |
| 26 | 0 | 2 | 1 | 1 |
| 27 | 0 | 1 | 2 | 1 |
| 28 | 0 | 1 | 1 | 2 |

TABLE 2-continued

| Type# | Positive | Negative | Iron | Aluminum |
|---|---|---|---|---|
| 29 | 0 | 0 | 4 | 0 |
| 30 | 0 | 0 | 3 | 1 |
| 31 | 0 | 0 | 2 | 2 |
| 32 | 0 | 0 | 1 | 3 |
| 33 | 0 | 0 | 0 | 4 |
| 34 | 0 | 1 | 3 | 0 |
| 35 | 0 | 1 | 0 | 3 |

Table 3 below sets forth the interaction of such polarities and materials, with other polarities and materials.

TABLE 3

| | Positive Magnetic Pole | Negative Magnetic Pole | Ferromagnetic Iron | Aluminum |
|---|---|---|---|---|
| Positive Magnetic Pole | Repels | Repels | Binds | Neutral |
| Negative Magnetic Pole | Binds | Repels | Binds | Neutral |
| Ferromagnetic Iron | Binds | Binds | Neutral | Neutral |
| Neutral Material (e.g., Aluminum) | Neutral | Neutral | Neutral | Neutral |

Although certain embodiments and combinations of various polarity combinations are discussed herein, it is understood that the scope of the present disclosure is not limited to the described embodiments and aspects. Furthermore, in various embodiments in which the apparatus 108 could include varying quantities of modeling devices 100, for example, three, four, five, eight, ten, thirty, fifty, or any other quantity, and/or greater quantities, even a greater number of planned and/or spontaneous interactions are possible. Therefore, assemblies of a plurality of modeling devices 100 can form various suitable shapes such as icosahedrons, polyhedrons, rippled sheets, pyramids, cylinders, boxes, star shapes, helix, geode and/or any other suitable shaped model or structure.

In one aspect, the respective magnets 106 are coupled to, and/or positioned in, a corresponding face 104 such that the magnet 106 exerts a magnetic force acting in a direction substantially perpendicular to the corresponding face 104, and therefore to the face 104 of an adjacent modeling device 100, resulting in a stronger bond between adjacently coupled modeling devices 100. In one aspect, one or more of the magnets 106 can include a shape configured to facilitate movement and/or rotation of adjacent modeling devices 100 with respect to each other. For example, in one embodiment one or more of the magnets 106 can include a substantially circular, ring-like or spherical shapes. Other suitable shapes are within the scope of the present disclosure, such as octagonal, square, hexagonal, polygonal, elliptical, and/or any other suitable shape or periphery.

In some embodiments, a magnetic force magnitude of each magnet 106 can be selectively assigned to facilitate building models that emulate attributes analogous to a target structure of which a user builds a model using an embodiment of the modeling apparatus 108. For example, in embodiments intended for chemical modeling purposes, the strength of the magnets 106 can be selectively assigned. For example, they can be assigned with relative strengths with respect to other magnets 106 on other faces 104, to simulate proportionally to the relative strength of bonds in a particular chemical structure.

Tetrahedral geometries are present in the atomic elements central to molecular biology, including not just carbon, but also nitrogen and oxygen, which bind in a tetrahedral pattern. With slight variations in the surface angles of the tetrahedral shaped modeling device 100 and modifications of the magnet 106 strength, the resulting apparatus 108 could be used to simulate the molecular structure and hydrogen bonding of water, DNA, and proteins, among other molecular structures.

Therefore, as an example, the angle between the center of the modeling devices 100 and the axis of any two magnets 106 on the corresponding surfaces 104 of a substantially absolute tetrahedron (each extending from a center point on the magnet 106 through the center of a volume defined by the modeling device 100 as in center-point 111 in FIG. 4B discussed below) is calculated to be 2*ArcSin (sqrt(2/3), or approximately 109.47 degrees, which is within 4% of the measured bond angle of roughly 105 degrees between the two hydrogen atoms in water.

By assembling the truncated tetrahedral subunits into a linear chain that can fold over onto itself as desired (in a manner analogous to the chains of amino acids in a protein) it is possible to assemble a virtually limitless number of structures. This type of folding also provides a physical system that can be used to study the complex, long range, dynamic geometry of atoms that bond in a tetrahedral pattern.

The truncated tetrahedral modeling devices 100 also offer a fairly accurate and intriguing simulation of the structure of carbon atom networks such as diamond (3-D network), graphite (2-D sheets) and graphene (monolayer carbon).

The following description sets forth a number of aspects for a thorough understanding of embodiments herein without any intention to limit the scope of the present disclosure; other undescribed suitable embodiments and variations are contemplated to be within the scope of the present disclosure.

In one example embodiment, the modeling apparatus 108 can include a plurality of modeling devices 100 configured to be coupled to one another at respective faces 104 via respective magnets 106. In one example application, the user may wish to build a model of a particular chemical compound in which various chemical bonds vary in strength. In such an embodiment, the plurality of magnets 106 corresponding to the bonds in the actual chemical compound can exhibit relative magnetic force strengths proportional to bond forces exhibited in the actual chemical compound. In such an embodiment, for example in an educational setting, not only students can visually ascertain the chemical compound structural model, they also can feel the relative bond strength between the various chemicals in that compound by attempting to separate the magnets. Thus, the strength of the hydrogen bond between water molecules could be modeled as roughly twenty times that of the covalent bond between the oxygen and hydrogen atoms in water via respective magnets 106 having substantially the same relative strength relationship.

In one example embodiment, the modeling apparatus 108 can include a plurality of modeling devices 100 configured to be coupled to one another at respective faces 104 via respective magnets 106. In one example application, the user may wish to build a model of a particular architectural structure in which various structural elements vary in load bearing capabilities and various elevational features may impose distinct qualities such as structural resilience. In such an embodiment, the plurality of magnets 106 corresponding to the coupling strengths and material attributes of the structural parts used can exhibit relative magnetic force strengths proportional to load transfer forces experienced in the actual architectural structure. In such an embodiment, for example in design planning setting, architects and engineers can physically model various design scenarios before resorting to expensive digital modeling and/or actual building of the structure.

Figure 3:
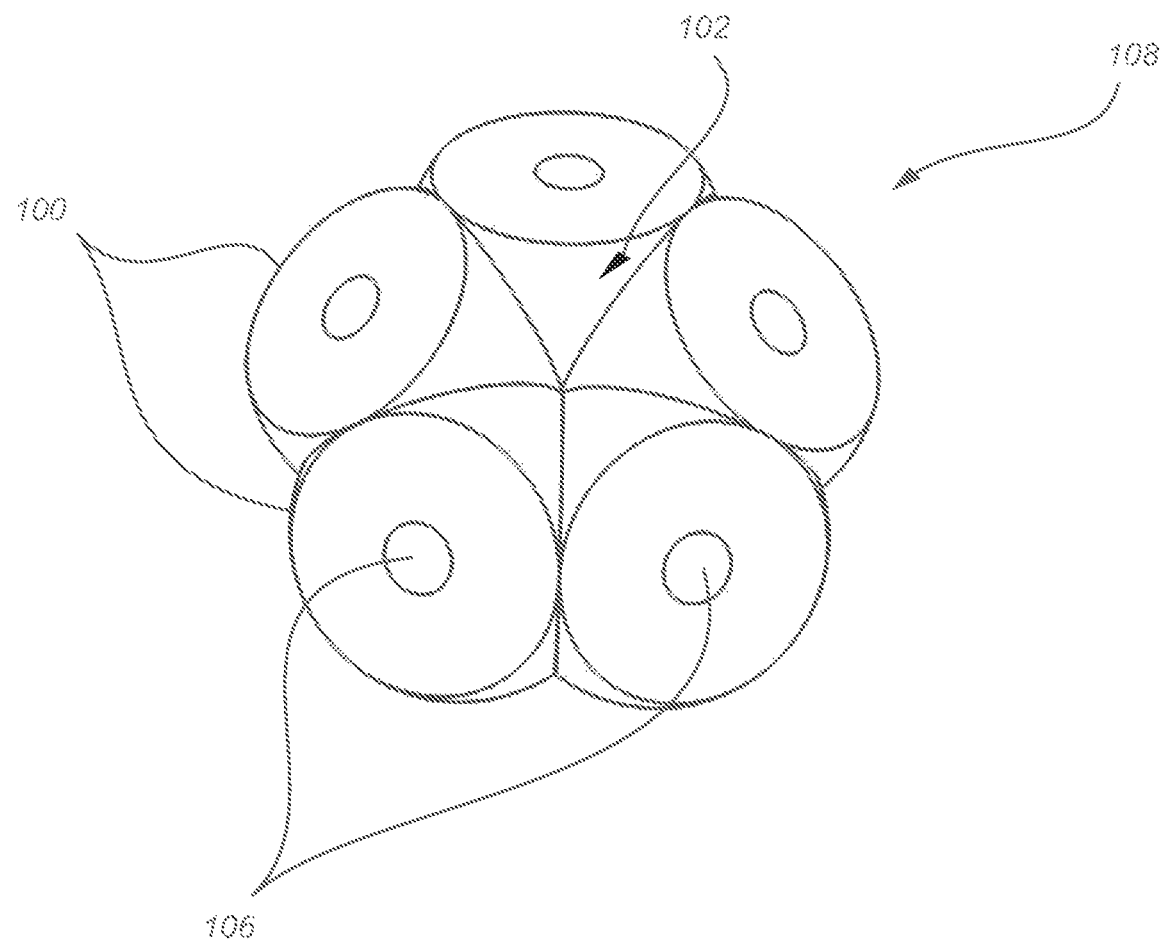
FIG. 3 illustrates an isometric view of the modeling apparatus of FIG. 2 in a second configuration according to one embodiment.

As illustrated in the embodiment of FIG. 2, the modeling devices 100 can be coupled to one another via respective magnets 106, for example to be rotatably coupled with respect to one another. In one aspect, the modeling devices 100 can be coupled to one another in a sequence or first unitary body as shown in FIG. 2, or in a generally circular pattern or second unitary as illustrated in the embodiment of FIG. 3, and/or any other suitable configuration based on each modeling device 100 being configured to be rotatably coupled to an adjacent modeling device 100.

In various embodiments of the present disclosure, the modeling device 100 can be configured to optimize being coupled to other modeling devices 100. For example, in an embodiment, each modeling device 100 can include a truncated tetrahedral shape as illustrated in FIGS. 1, 2, and 3.

According to one embodiment, as discussed above with respect to FIG. 1, each modeling device 100, in addition to exhibiting a substantially and/or truncated tetrahedral shape, includes corners or vertices having the curvilinear boundary or shape or periphery 102. In such an embodiment, when two or more modeling devices 100 are coupled, the respective modeling devices 100 can freely rotate with respect to one another without their vertices serving as obstacles to such rotation.

Embodiments adopting a truncated tetrahedron shape for the modeling device 100 lend to flexibility in modeling objects, chemical compounds, structural elements, and natural forms, as well as being better suited to accommodate a wider range of artistic form factors. In addition, the above-stated curvilinear boundary 102 of corners or vertices of the truncated tetrahedral structure of each modeling device 100 accommodate movable coupling of adjacent modeling devices100.

Referring to FIG. 3, the corresponding degree of the curvilinear boundary 102 can in various embodiments be selectively assigned to promote rotation and/or movement of adjacent modeling devices 100 with respect to one another while preserving a volume of each modeling device 100 to still exhibit a truncated tetrahedral shape.

In one embodiment, the above-described curvilinear boundary 102 at each corner of the truncated tetrahedral modeling device 100 can be substantially identical for the four truncated corners of the tetrahedron. In one aspect, such trimming of the modeling device 100 corners can correlate to a sphere about the modeling device 100 form factor.

In one aspect, the plurality of modeling devices 100 being coupled and forming a first unitary body such as that in FIG. 2, can be selectively movable between a first relational arrangement between the modeling devices 100, and a second relational arrangement therebetween while at least some of the modeling devices remain coupled and the modeling apparatus transitions to a second unitary body such as that shown in FIG. 3.

Figure 4A:
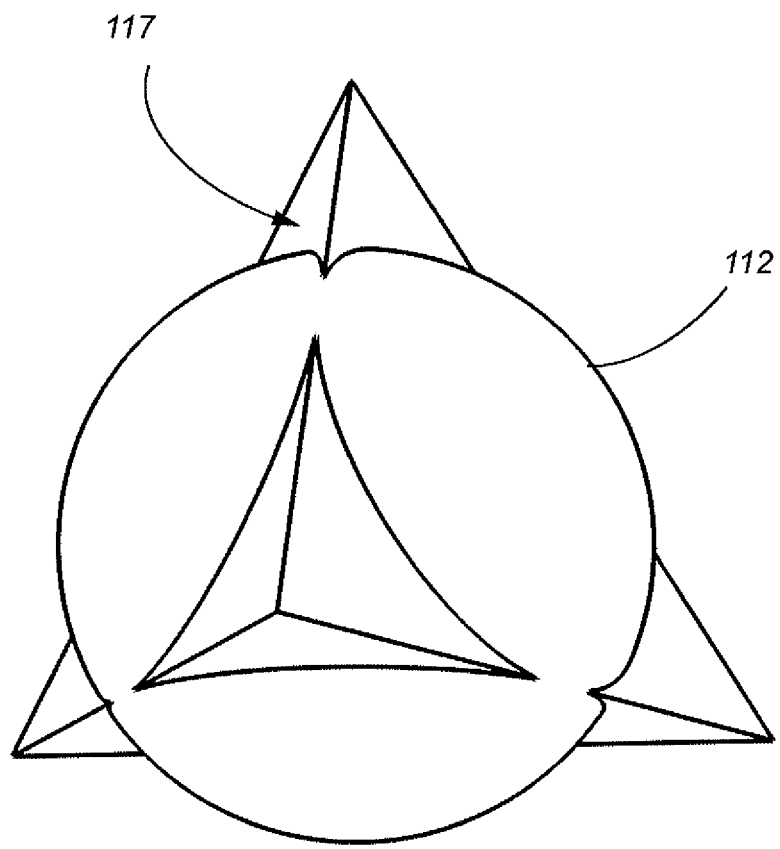
FIG. 4A illustrates a tetrahedron and a sphere about the tetrahedron and intended to serve as a truncation geometry with respect to the tetrahedron according to one embodiment.

For example, FIG. 4A illustrates one embodiment according to which vertices 102 of a truncated tetrahedron are defined via an intersection of a spherical periphery 112. In one aspect, the modeling device100 can be trimmed according to the spherical periphery 112 symmetrically surrounding the modeling device 100, as illustrated in FIG. 4B. In one aspect, the spherical periphery 112 has a radius 110 extending from a center-point 111 of a volume occupied by the tetrahedron modeling device 100 to a midpoint 113 of an edge 115 of an original tetrahedral from factor with sharp vertices.

Figure 4B:
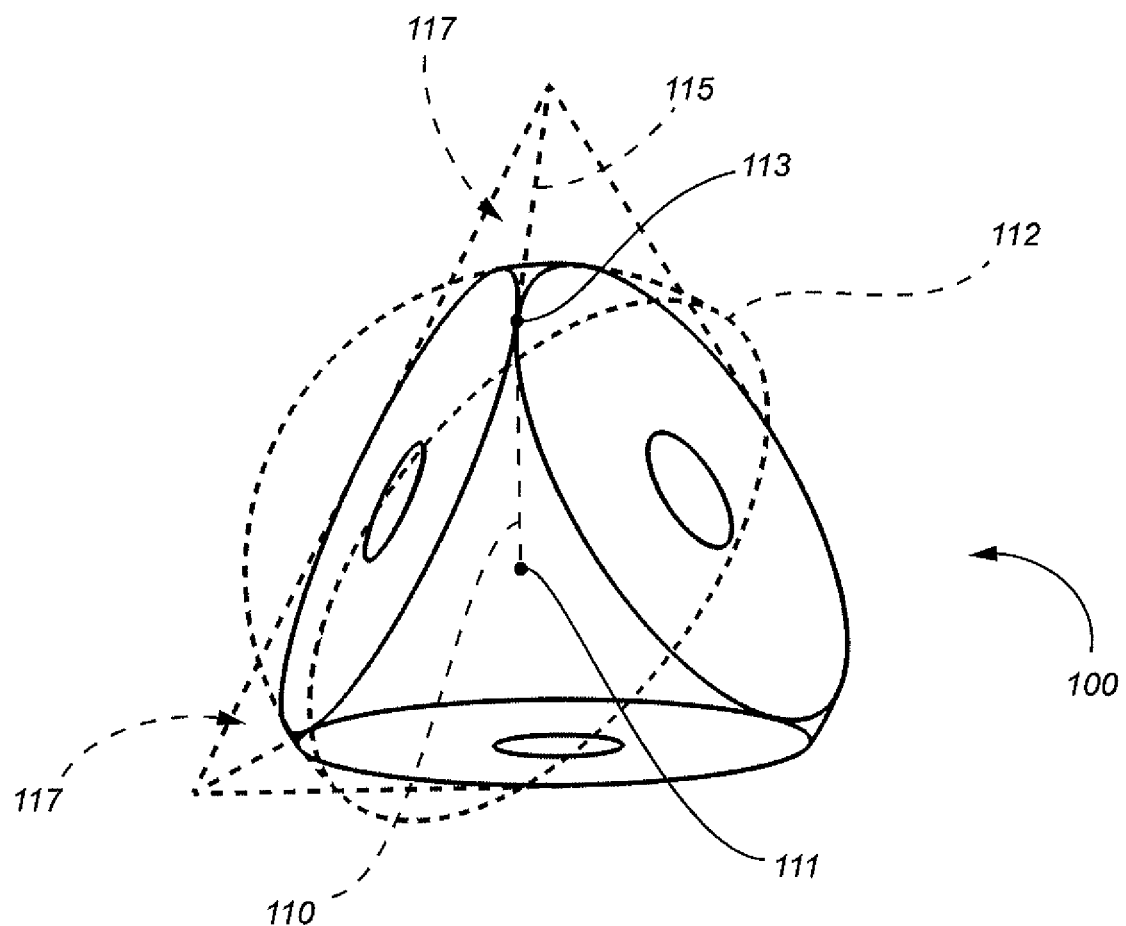
FIG. 4B illustrates the modeling device of FIG. 1 and a spherical periphery along portions of which the modeling device is truncated at its corners to define a curvilinear surface thereof.

Therefore, in the illustrated embodiment of FIG. 4B, the original tetrahedral form factor with sharp vertices can be trimmed by the periphery 112 to remove volumes 117 formed beyond the periphery 112 and the original sharp vertices of the tetrahedron.

In one embodiment, the radius of the spherical periphery 112 can be selectively assigned to facilitate movement of adjacently coupled modeling devices 100 with respect to each other while preserving sufficient volume of the modeling device 100 to exhibit a substantially and/or generally tetrahedral shape. In one aspect, the selective radius of the spherical periphery 112 can be calculated as outlined in the Tetrahedron Curvilinear Truncation Radius Calculation toward the end of this Detail Description section.

In one embodiment, the faces 104 converge toward the midpoint of each edge of the tetrahedral modeling device 100, and in one aspect they touch, are adjacent to one another, or are contiguous to one another, at converging regions 119, illustrated in FIG. 1. Such a configuration facilitates higher resolution target structures and improved modeling of chemical compounds.

Figure 5:
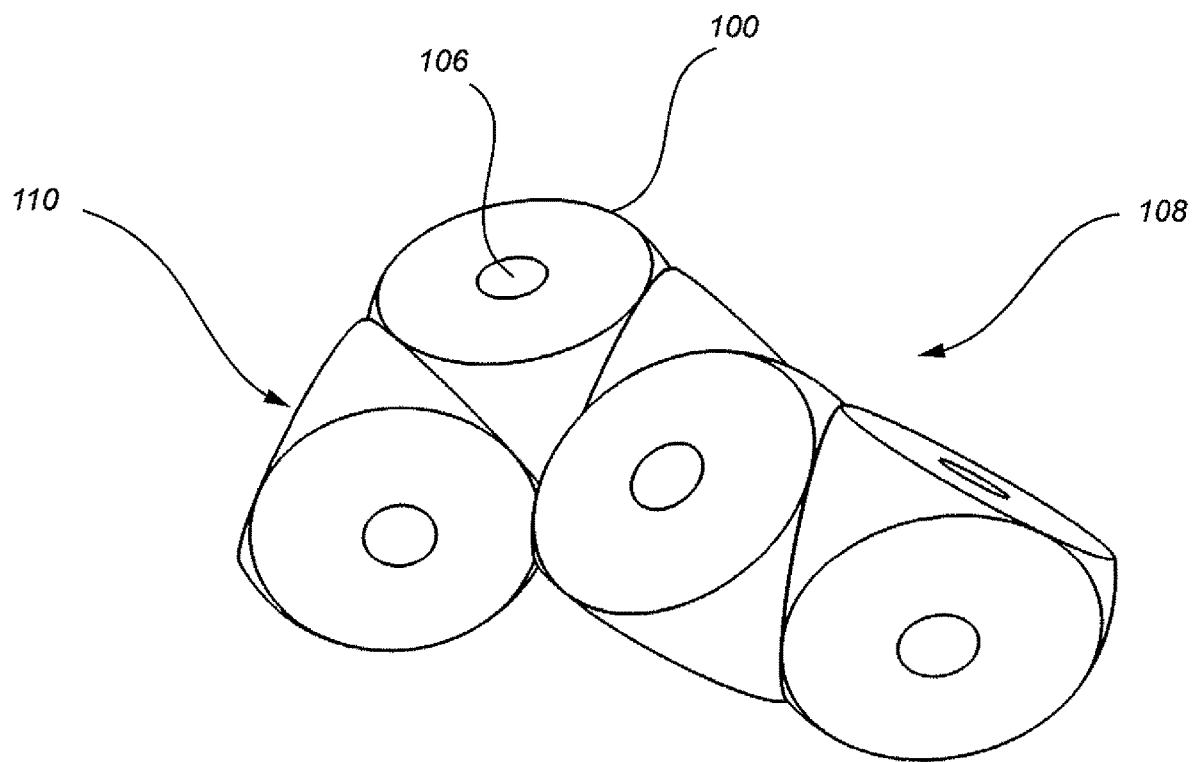
FIG. 5 illustrates an isometric view of the modeling apparatus of FIG. 2 in a third configuration according to one embodiment.

The modeling device 100 having a truncated tetrahedral shape and curvilinear corners 102 facilitates free rotational movement of adjacently coupled modeling devices 100 in certain applications such as that shown in FIG. 2, without the user having to remove or decouple any one of the modeling devices 100. For example, FIG. 2 illustrates the apparatus 108 in a first configuration, and holding one end of the apparatus 108 while rotating an opposing end thereof will cause a ripple effect throughout the apparatus 108 to arrive at a second configuration, such as for example the second configuration illustrated in FIG. 3 or even a third configuration shown in FIG. 5, among other numerous configurations not shown.

Further rotating the apparatus 108 and or one or more of the modeling devices 100 can yield other configurations including configurations where the modeling devices 100 on opposing ends of the apparatus 108 are positioned adjacent one another and couple to each other, such as the configuration shown in FIG. 3. The user in all these movements and configurations can manipulate the apparatus 108 to arrive at a desired structure without having to decouple any of the modeling devices 100.

In some applications, the modeling devices 100 at opposing ends of the apparatus 108 can be held and moved in a generally closed perimeter motion, such as a generally circular and/or elliptical motion, thereby rotating the intermediate modeling devices 100 in unison along a repeated pattern, such as a repeated rotation, about an axis such as a longitudinal axis 114 of the apparatus 108, illustrated in FIG. 2.

Figure 6:
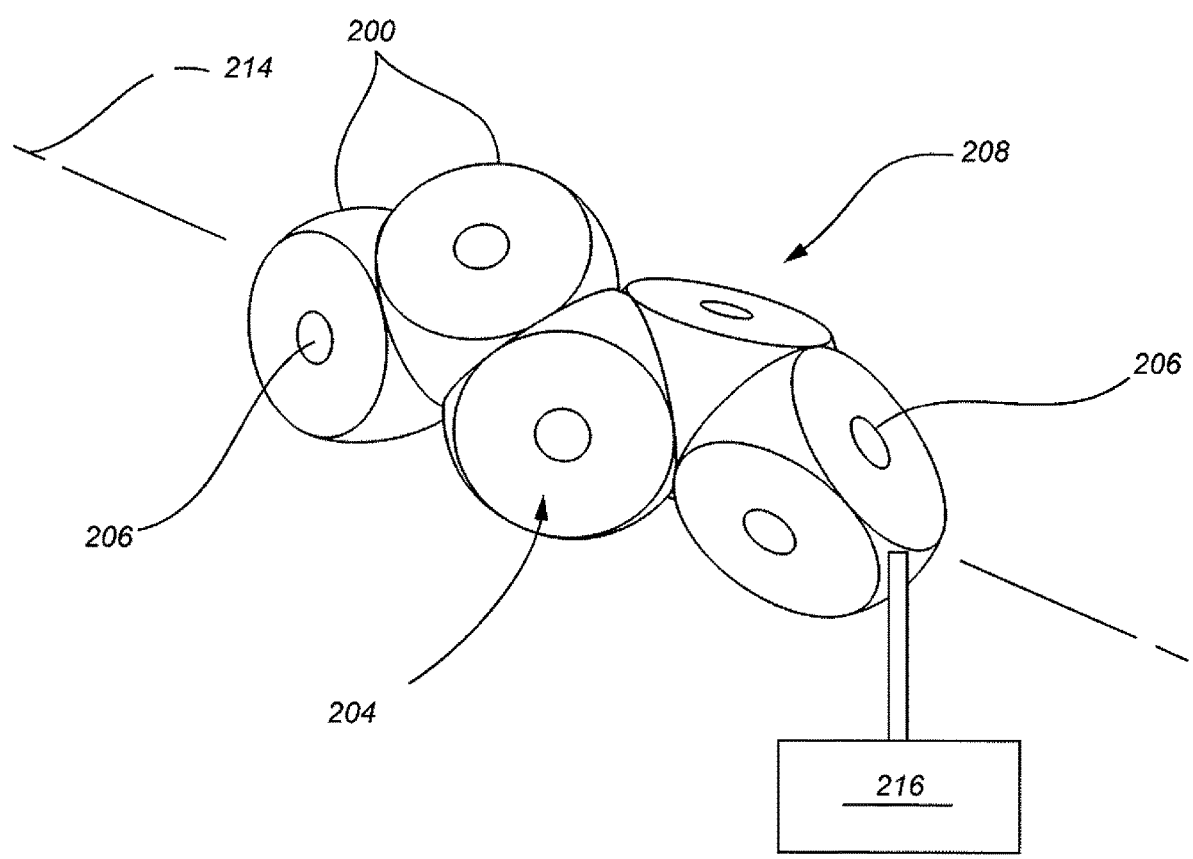
FIG. 6 illustrates an isometric view of a modeling apparatus coupled to an actuating device according to one embodiment.

Some embodiments of this disclosure can serve functions beyond modeling, art, building, and structural representations; for example, some embodiments of a modeling apparatus can serve mechanical functions. In one embodiment for example, as illustrated in FIG. 6, a modeling apparatus 208 can include a plurality of modeling devices or units 200 having a truncated tetrahedral shape, and rotatably and removably coupled to one another via a coupling or magnetic device 206 attached to each face 204 of each modeling device 200.

In one aspect, the apparatus 208 can include at least a first motor or other actuation device 216 operably coupled with respect to at least one end of the apparatus 208, for example to the modeling device 200 positioned toward a first end of the apparatus 208. In one aspect, the motor 216 can be configured to impart a motion to the end modeling device 200, while an opposing second end of the apparatus 208 is fixed or operably attached to a second actuation device or motor. Taking the example of the opposing end being fixed, the motor 216 rotating the first end can in turn rotate intermediately positioned modeling devices 200 to bring about an actuated motion.

Such a mechanical embodiment can be advantageous for various applications, such as, visual arts and moving art installations, generating energy, processing and/or stirring (e.g., food, paint, dairy, and the like), architectural models, emulating chemical or biological movements, and/or any combination thereof, and/or any other suitable application where exhibiting motion of an apparatus according to an embodiment of the present disclosure is desired.

Figure 7:
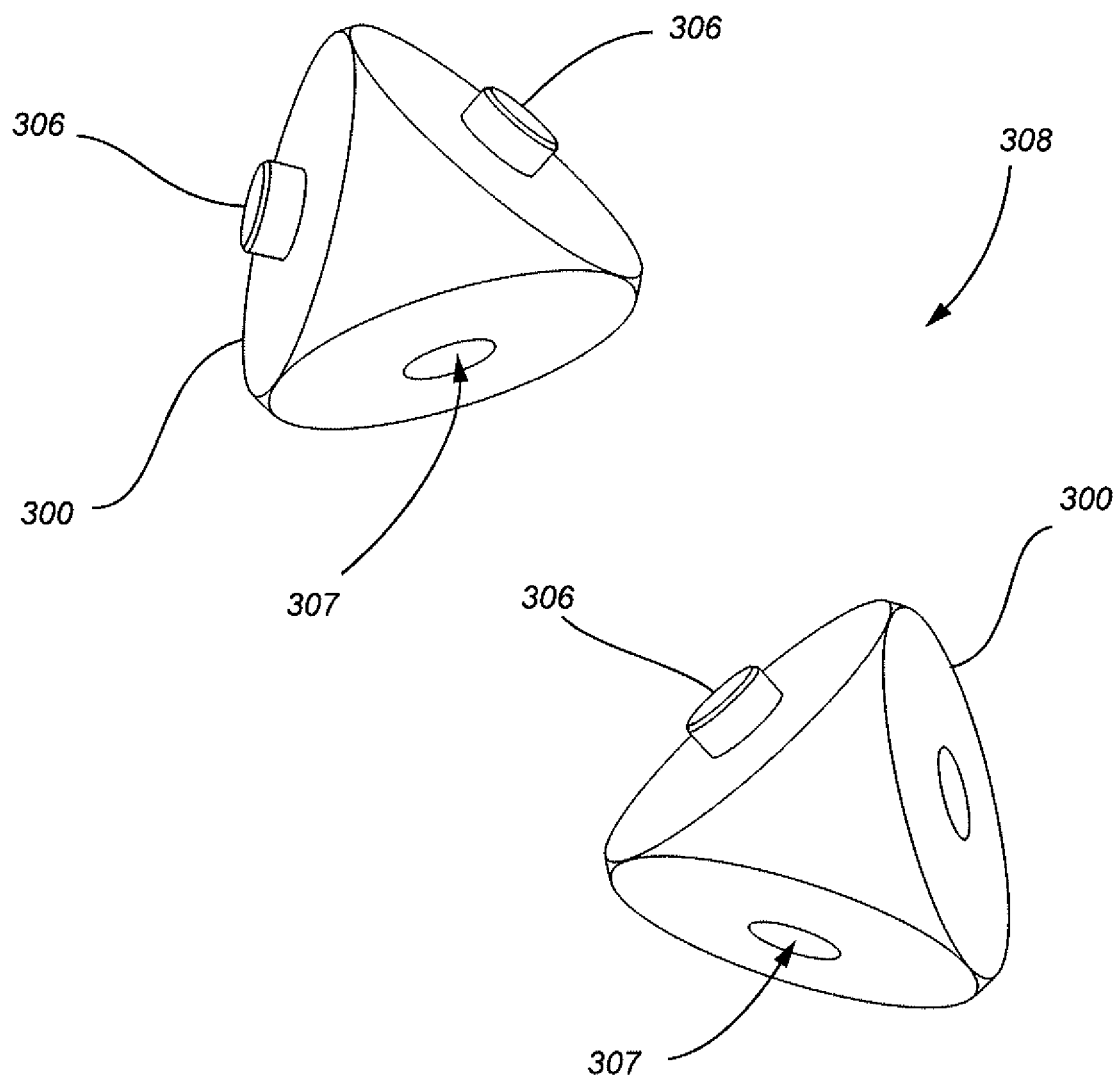
FIG. 7 illustrates an isometric view of a modeling apparatus according to another embodiment.

FIG. 7 illustrates yet another embodiment of the present disclosure, in which a modeling apparatus 308 can include a plurality of modeling devices or units 300 having a truncated tetrahedral shape with curvilinear vertices, and configured to be selectively rotatably and/or removably coupled to one another via coupling device 306, 307 attached or couple to, or formed in, each face 304 of each modeling device 300.

For example, according to one aspect, as illustrated in FIG. 7, each modeling device 300 can include two protrusions 306 formed or attached to two opposing faces 304, and two cavities 307 formed in the remaining two opposing faces 304. The protrusions 306 can include any one or more of a protuberance, tab, bulge, extension, or the like. The cavities 307 can include any one or more of a recess, hole, opening, indentation, or the like. In one embodiment, each cavity 307 of one modeling device 300 is configured, shaped, or adapted, to be removably coupled to, or receive, a complementary protrusion 306 of another modeling device 300. In one aspect, the cavity 307 and the protrusion 306 are configured to be rotatably coupled to one another.

It is understood that different combinations of protrusions and cavities can be incorporated on modeling devices of different embodiments. For example, in some embodiments, a modeling device may have three protrusions and one cavity, four protrusions, four cavities, or three cavities and one protrusion, similar to the various polarity configurations discussed with respect to the magnetic embodiments.

As discussed above larger quantities of a plurality of modeling devices 108 can be combined in various permutations to yield a large variety of complex structures and models. The following description provides nonlimiting examples of a few of such models.

Figure 10:
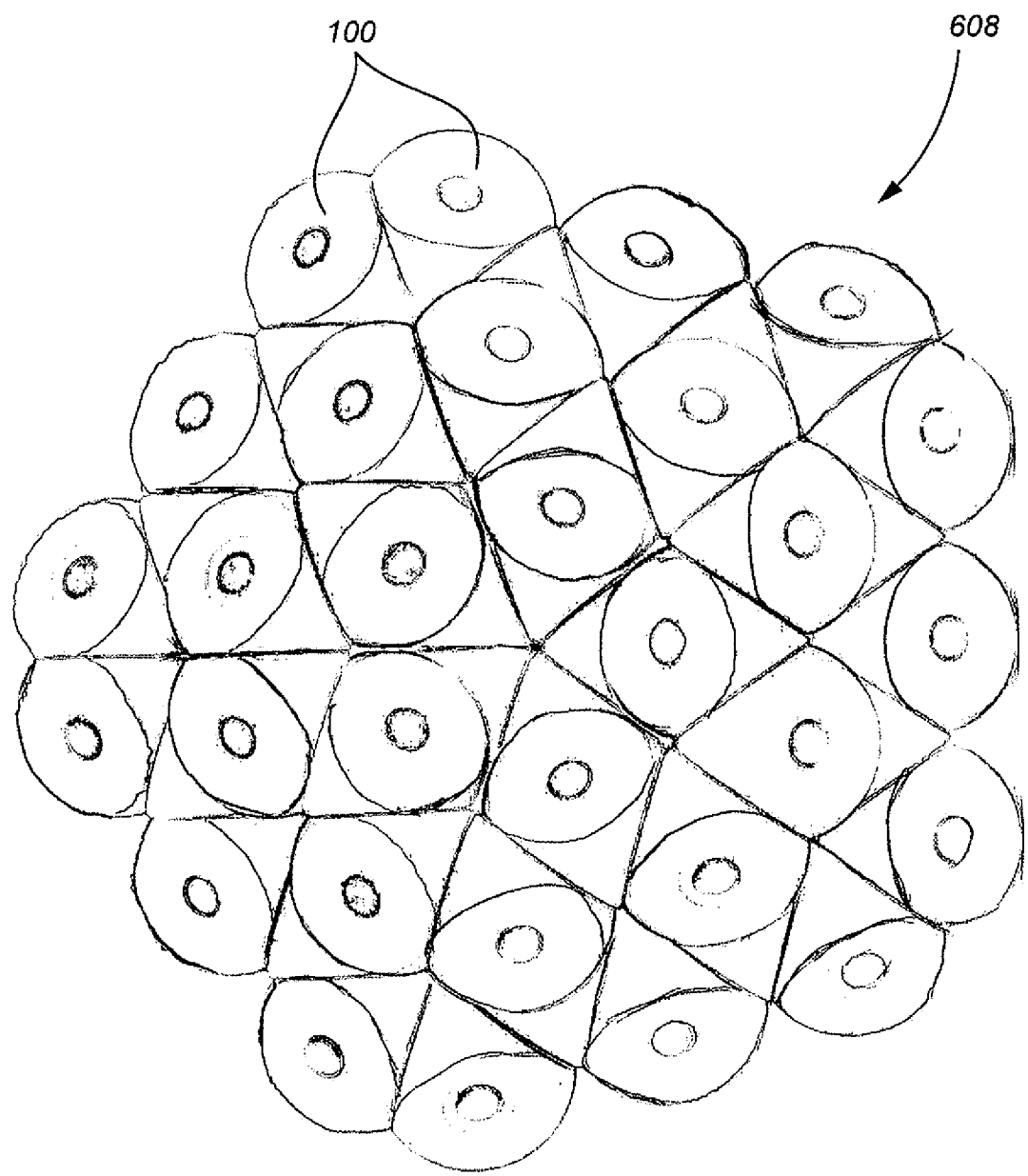
FIG. 10 illustrates a front view of a modeling apparatus resembling a complex star shape, according to one embodiment.
Figure 11:
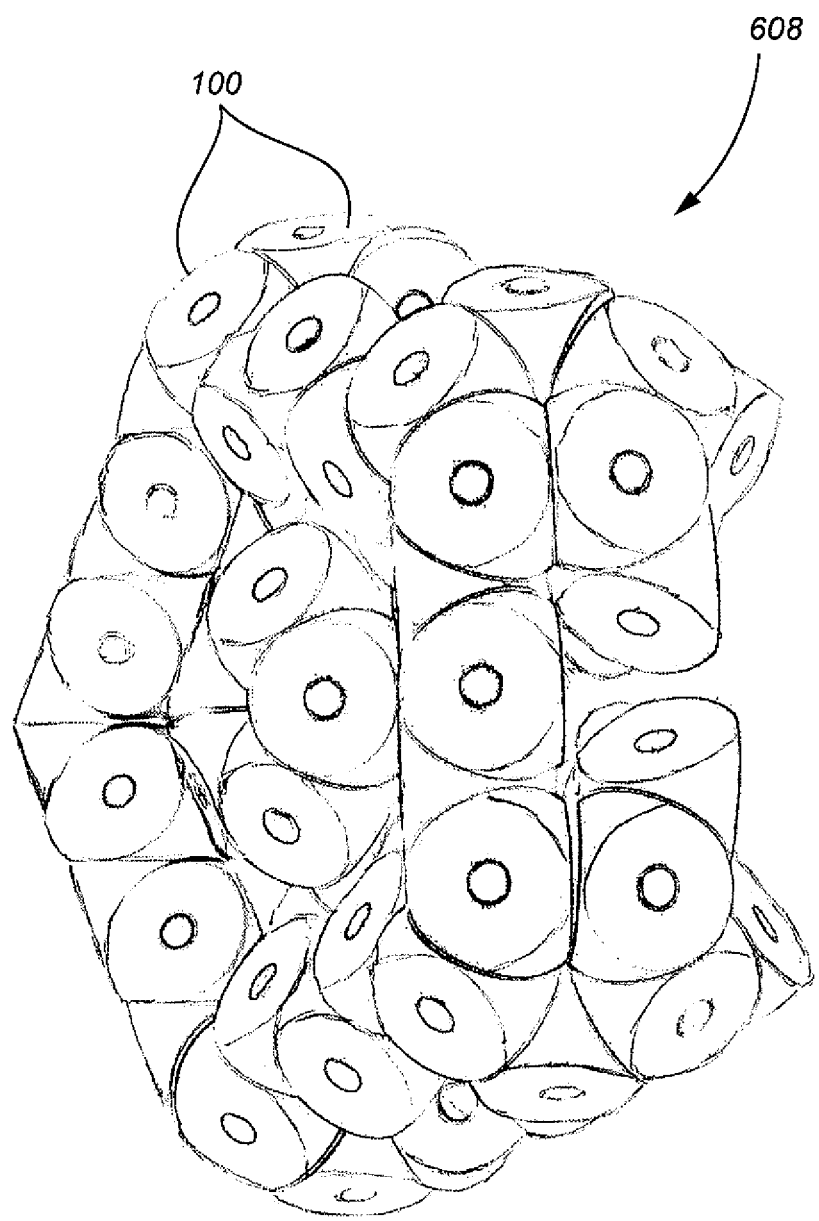
FIG. 11 illustrates a rear isometric view of the modeling apparatus of FIG. 10, according to one embodiment.

For example, FIG. 8 illustrates an isometric plan view of a modeling apparatus 408 including a plurality of modeling devices 100 generally resembling an organic chain or abstract form factors according to one embodiment. FIG. 9 illustrates an isometric view of a modeling apparatus 508 including a plurality of modeling devices 100 coupled in an abstract form factor according to one embodiment. FIG. 10 illustrates a front view of an embodiment in which a plurality of modeling devices 100 are coupled to form a complex star shape modeling apparatus 608 with an indented and curvilinear center. FIG. 11 illustrates an isometric rear view of the apparatus 608 of FIG. 10.

Figure 12:
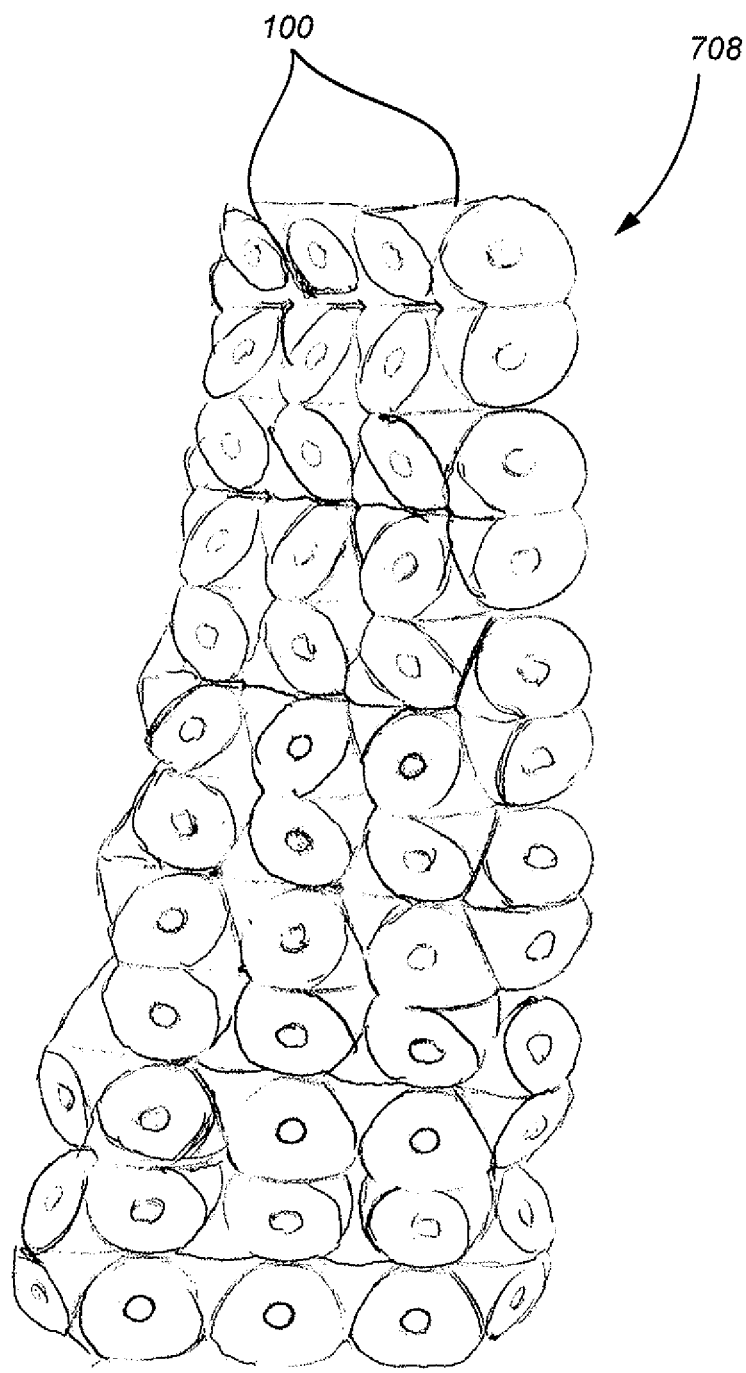
FIG. 12 illustrate an isometric view of a helical modeling apparatus in which a plurality of modeling devices can rotate in unison and in a dynamic fashion to create various twist angles, according to one embodiment.
Figure 13:
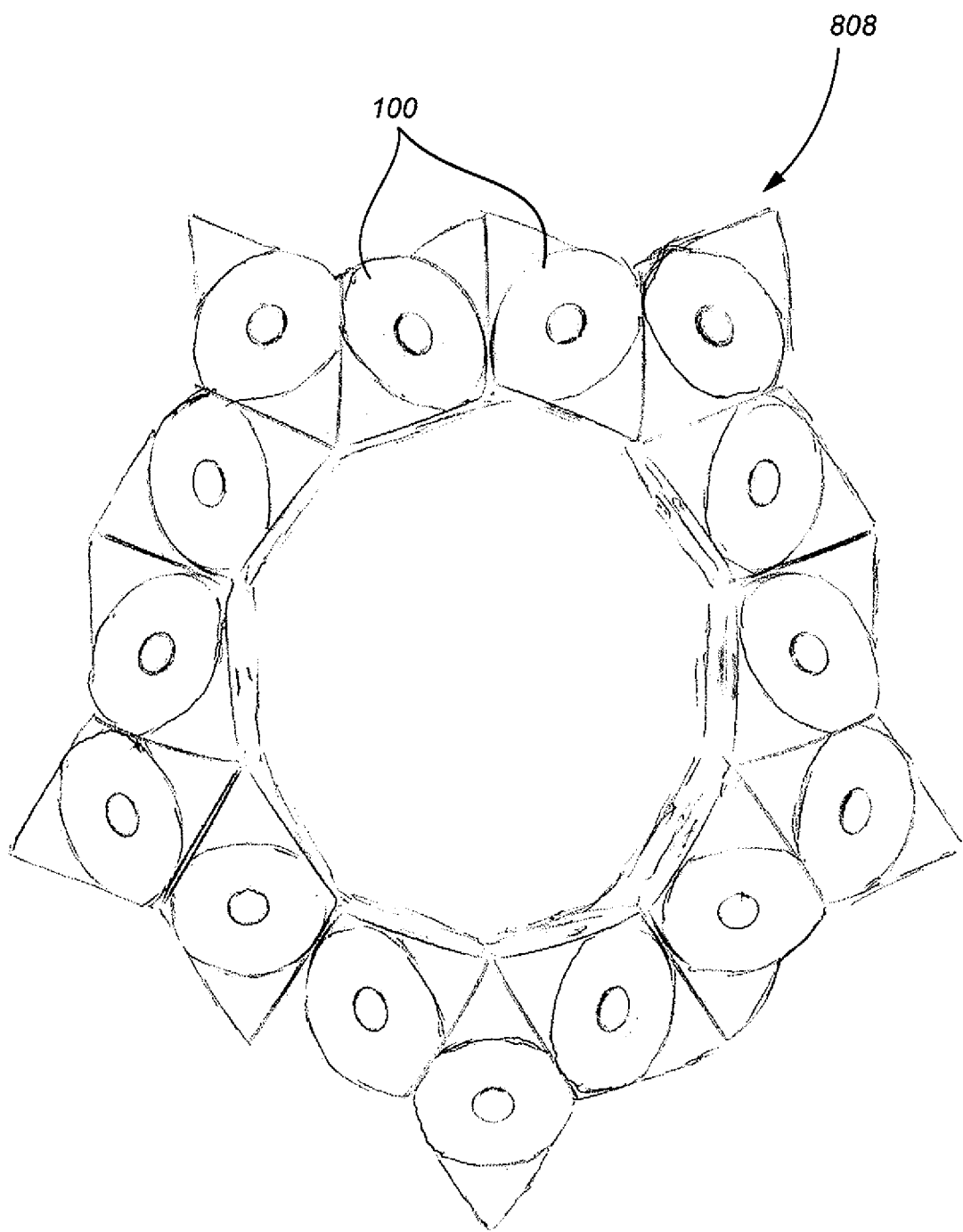
FIG. 13 illustrates a plan view of a substantially circular cylindrical modeling apparatus according to one embodiment.

FIG. 12 illustrates an embodiment of a modeling apparatus 708 including a plurality of modeling devices 100 to exhibit a twisting helix, which can be used to model DNA and RNA. In FIG. 12, a plurality of modeling devices 100 are capable of rotating in unison with respect to another plurality of modeling devices 100. FIG. 13 illustrates a plan view of a cylindrical modeling apparatus 808 including a plurality of modeling devices 100 coupled in a manner as described herein, according to one embodiment It is understood that various other applications and forms and models are possible and within the scope of the present disclosure. For example, modeling devices 100 can serve as elements of a puzzle game. For example, the modeling devices 100 can be assembled into a larger tetrahedron or other shape containing 5, 14, 30, 55 or higher or other quantity of modeling devices 100. Each surface of this larger tetrahedron can be imprinted with a pattern, image or logo. The puzzle game can involve scrambling the individual tetrahedrons and then trying to reassemble them to reconstitute the images on the four sides of the tetrahedron. This can be achieved for example without decoupling the modeling devices 100, or allowing decoupling, depending on the rules of the game or puzzle.

Figure 14:
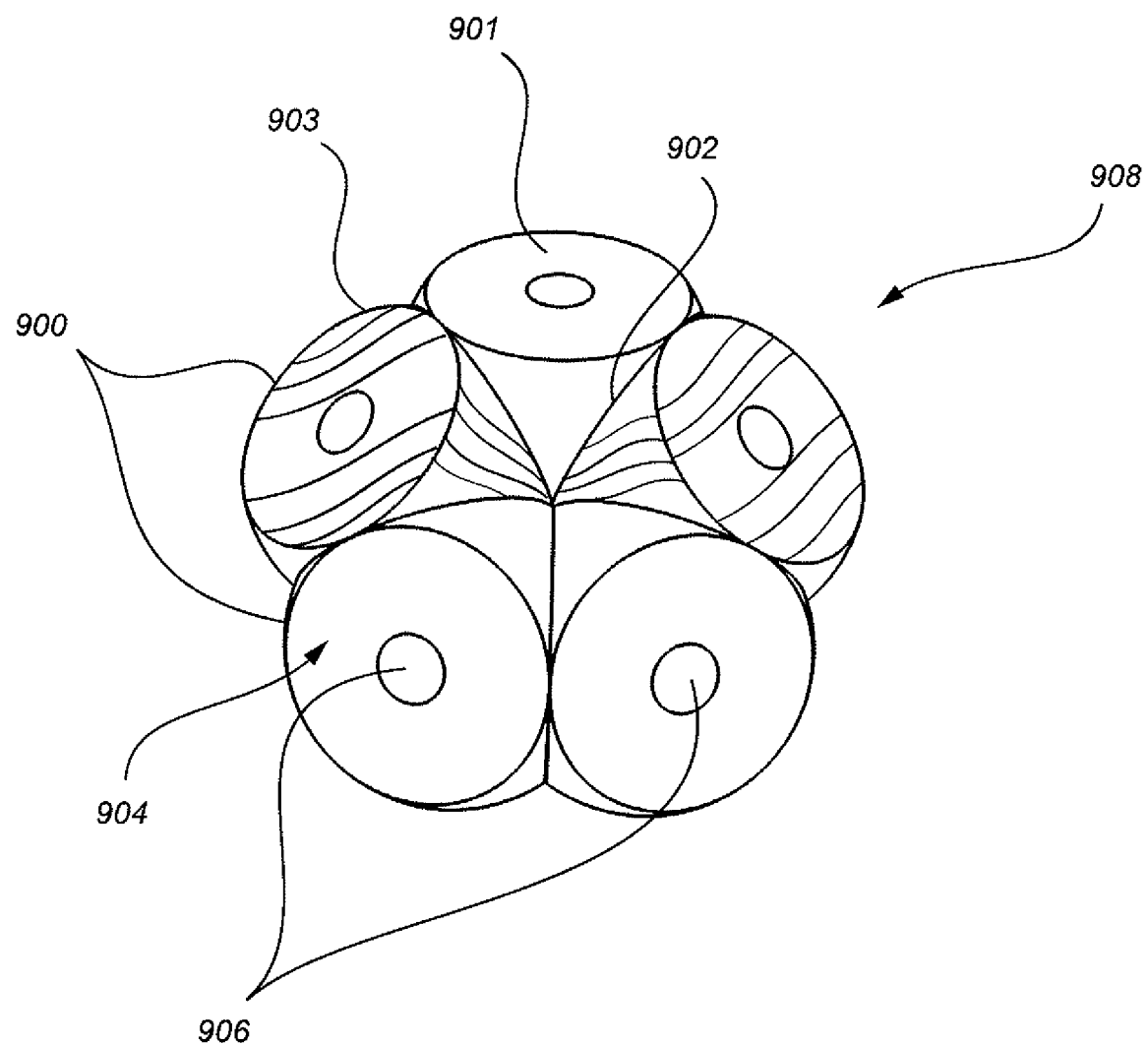
FIG. 14 illustrates an isometric view of a modeling apparatus in a first arrangement of two groups of modeling devices, according to one embodiment.
Figure 15:
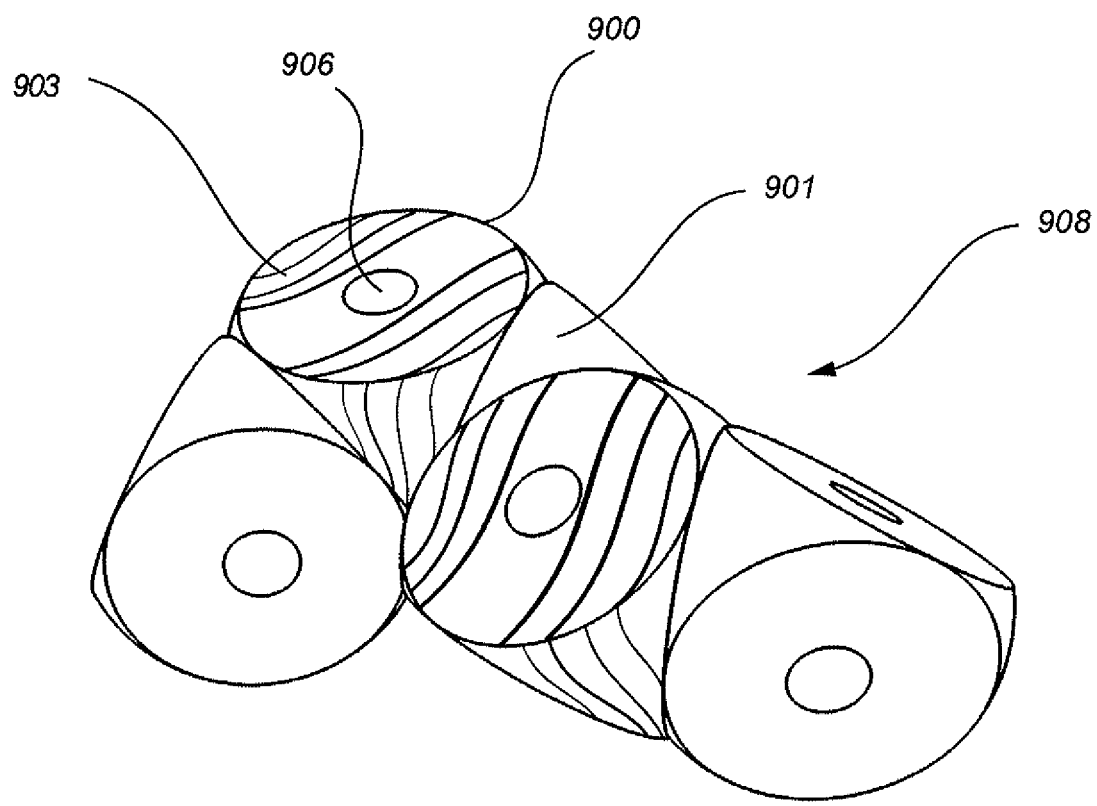
FIG. 15 illustrates an isometric view of the modeling apparatus of FIG. 14 in a second arrangement of two groups of modeling devices, according to one embodiment.

To demonstrate a simple example of a puzzle or game, FIGS. 14 and 15 illustrate a modeling apparatus 908 including a plurality of form factors or modeling devices 900, each form factor 900 having a volume including a center and a plurality of edges. Each form factor 900 includes a spherical truncated tetrahedral shape having four faces and four vertices, each vertex truncated with a spherical boundary, the spherical boundary being defined by a sphere having a radius extending from the center of the volume to a midpoint of one of the edges thereof, as described above.

In one aspect, the form factors 900 include at least four interface elements 906, each interface element 906 being attached to a respective face 904 of the form factor 900. The interface elements 906 can be adapted to be coupled to at least some of the interface elements 906 of adjacent form factors 900, thereby coupling adjacent form factors 900. The interface elements 906, similar to the linking members 106 above, can include a magnetically charged element, such as a positively or negatively charged magnet, or they can be iron, or some of them can be a neutral element such as aluminum or plastic.

In one aspect, the plurality of coupled form factors 900 are capable of rotating with respect to adjacently coupled form factors 900, the spherically truncated vertices of each form factor 900 clearing the spherically truncated vertices of adjacent form factors 900 as they rotate with respect to each other.

As illustrated in FIGS. 14 and 15, the plurality of form factors or modeling devices 900 can include at least a first group 901 and a second group 903, each group having a distinct attribute such as size, color, shading, material, any combination thereof, and/or any other suitable distinguishing attribute. In the illustrated embodiment of FIGS. 14 and 15, the first group 901 of form factors 900 are clear on their surfaces with no pattern, while the second group 903 of form factors 900 are identified having a pattern of curved lines on their surfaces. In the game or puzzle, the first and second groups 901, 903 are selectively coupled to exhibit a first relational arrangement between the groups 901, 903, as shown in FIG. 14.

FIG. 15 shows one aspect of the modeling apparatus 908 in a scrambled second relational arrangement between the two groups. The modeling device 908 is manipulable to movably rearrange the form factors 900 back to the first relational arrangement between the first and second groups 901, 903, while the form factors 900 remain coupled.

Therefore, upon being scrambled a player's goal is to rearrange back to the original relational arrangement shown in FIG. 14.

Users can vary the rules to allow limited decoupling or not allow decoupling of the form factors 900. For example, in one embodiment, a decoupling can be allowed so long as the modeling apparatus 908 is not separated into two portions.

It is understood the arrangement and quantity of form factors shown in FIGS. 14 and 15 are provided as an example, and they are a simple version of such a puzzle or game, and that larger quantities of form factors can provide for a more complex and complex game or puzzle, which users can customize and design.

In another aspect, the modeling devices 100 can serve as elements of a magnetic toy. For example, if an individual modeling device 100 of varying polarity is tossed 6-10 feet at a modeling apparatus 108 including a plurality of modeling devices 100, it will instantly gravitate towards a surface of opposite polarity and bind with a pleasing and tactile "click." It has been found that children enjoy doing this and envisage that it could be developed into a game, using tetrahedrons of varying colors and polarity.

In another aspect, the modeling devices 100 can serve as an executive desktop "toy" or art piece. For example, the modeling devices 100 can be visually attractive and have an eye catching, high-tech and very geometric desktop appearance. They can be customized into varying desktop shapes as demonstrated herein.

The following sets for the Tetrahedron Corner Radius Calculation referred to elsewhere in this disclosure.

Tetrahedron Corner Radius Calculation

Figure 16:
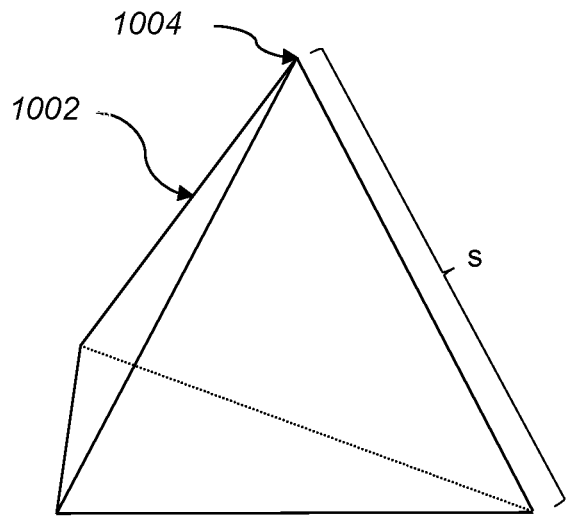
FIGS. 16 through 18 illustrate an equilateral tetrahedron made up of 6 equal line segments of length "s."

Various embodiments of the present disclosure include modeling devices 100 respectively having generally rounded or curvilinear vertices or corners. In different aspects, the radius of such curvilinear vertices can vary. What follows is a description of one embodiment calculation of the vertices 102 curvilinear radius. Consider an equilateral tetrahedron as shown in FIG. 16 made up of 6 equal line segments of length "s."

Each face is an equilateral triangle having three sides 1002 each of side length "s" and angles of 60 degrees.

The formed by the sides 1002, and four vertices 1004.

Figure 17:
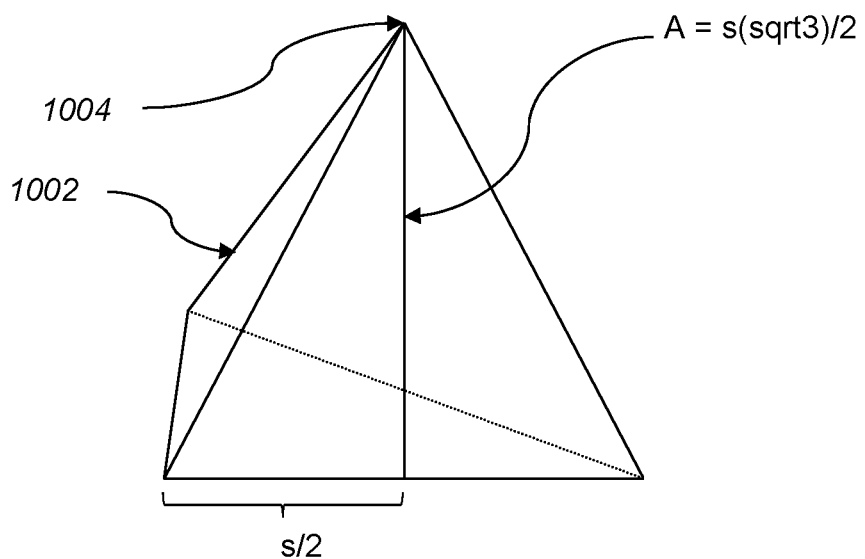

A length of a line segment A from one of the vertices 1004 to the opposing side 1002 as shown in FIG. 17, can be calculated from the Pythagorean Theorem.

Figure 18:
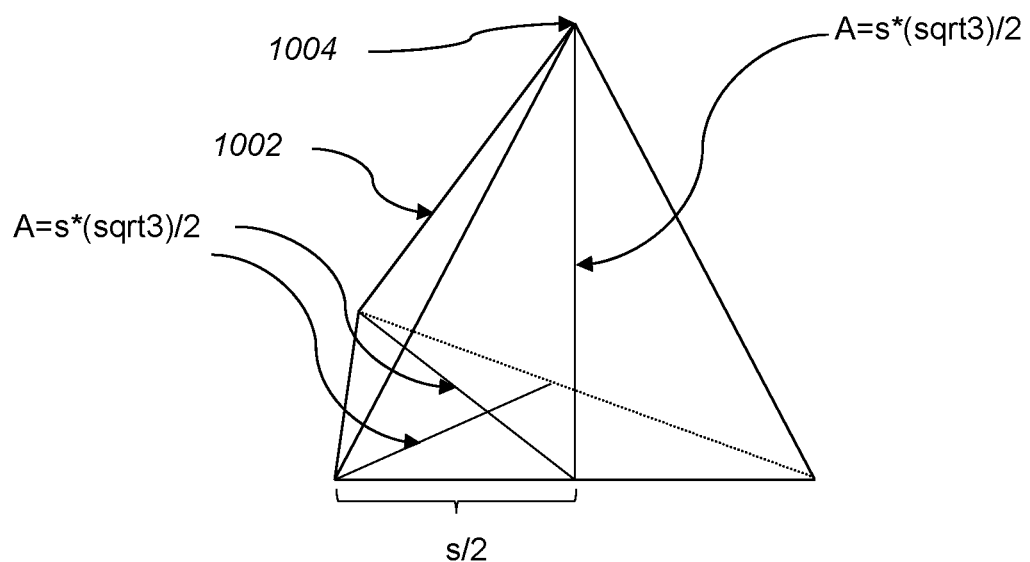

In a similar manner, as illustrated in FIG. 18, it can be shown that each of the line segments A from respective face vertices 1004 to an opposing face side 1002 are identified as A and have the length $s*\text{sqrt}3/2$.

Figure 19:
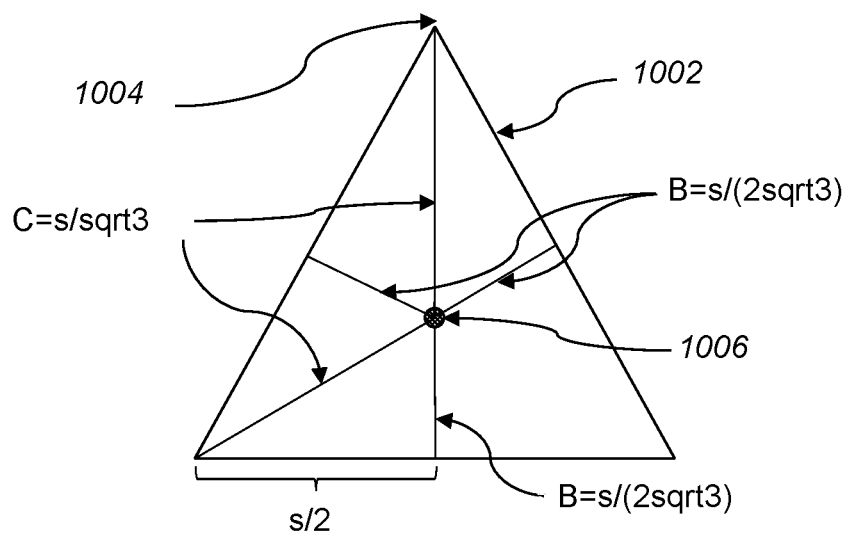
FIG. 19 illustrates a plan view of a base face of the equilateral tetrahedron of FIG. 18.

FIG. 19 is a plan view of a base face of the above-described tetrahedron in FIG. 18 including a smaller 60-30 right triangle in which line segment $B=s/(2\text{sqrt}3)$ and line segment $C=s/\text{sqrt}3$, line segment B extending from the midpoint of a side 1002 to a midpoint 1006 of the base face and line segment C extending from the vertex 1004 to the midpoint 1006 of the base face. See also FIG. 20 bottom face in the regard.

Figure 20:
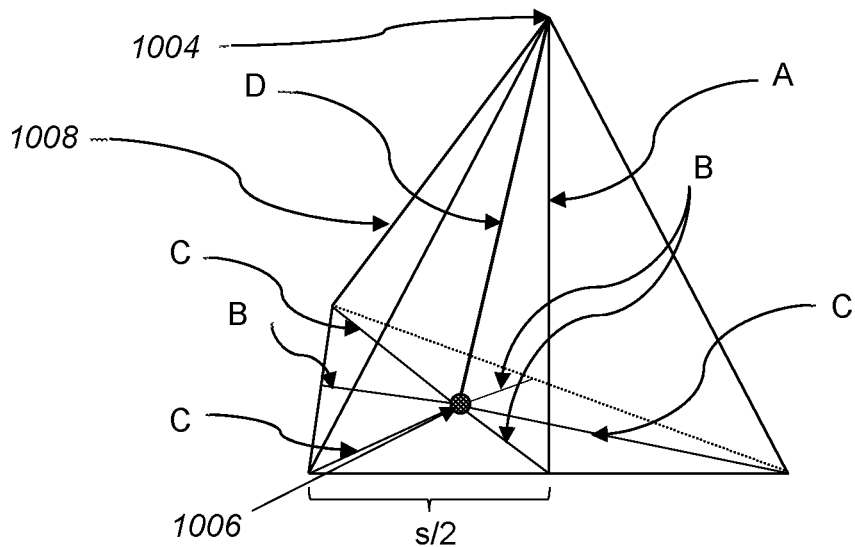
FIG. 20 illustrates the equilateral tetrahedron of FIG. 16 with certain line segments to demonstrate certain length features as described in this disclosure.

FIG. 20 illustrates a line segment resembling a perpendicular "pole" supporting a "tent" of the tetrahedron, extending from the midpoint of the base face to the opposing vertex 1004 and identified as D. Length of line segment D equals to:

$$\text{sqrt of } [(A)^2 \text{ minus } (B)^2] = s*\text{sqrt}(3/4-1/12) = s*\text{sqrt}(8/12) = s\ \text{sqrt}(2/3)$$

Alternatively, D also equals sqrt of $s^2$ minus $C^2 = s\ \text{sqrt}(2/3)$

These two equivalent ways of calculating the length of line segment D also verify that line segment D is perpendicular to the base face of the tetrahedron.

Figure 21:
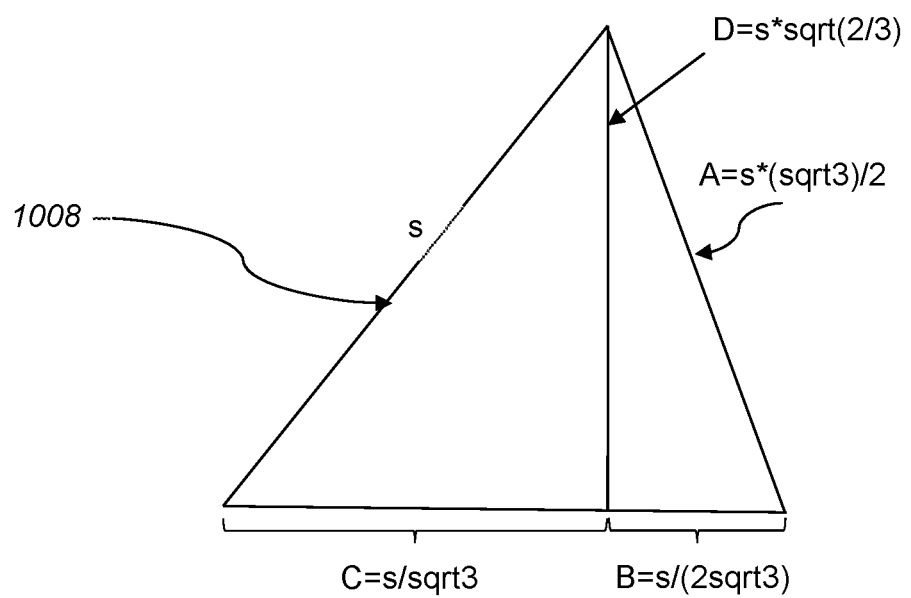
FIG. 21 illustrates a portion of the equilateral tetrahedron of FIG. 20 on a plane formed by line segments D and A.

Now consider the isosceles triangle shown in FIG. 21 that slices from one side 1008 (FIGS. 20 and 21) to the middle of the opposite face, identified as line segment A in FIG. 20, of the tetrahedron and passes through the tent pole or line segment D:

Note that $s/\text{sqrt}3 + s/(2\text{sqrt}3) = s/\text{sqrt}3\ (3/2) = s\ (\text{sqrt}3)/2$.

Figure 22:
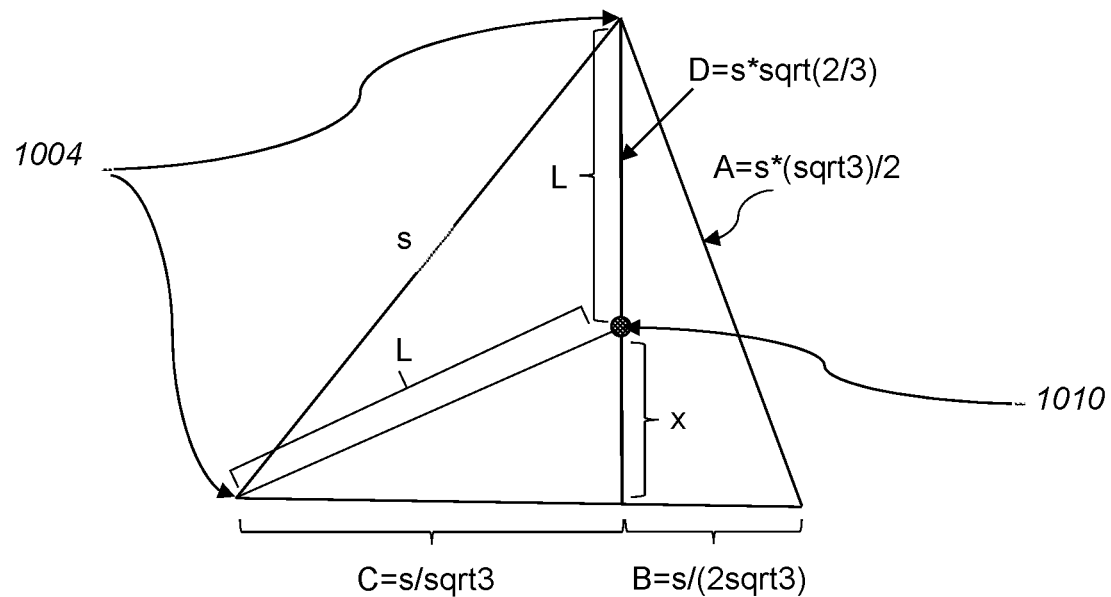
FIG. 22 illustrates the view of FIG. 21 with added line segment features to further demonstrate certain length features and a volumetric center of the equilateral tetrahedron as described in this disclosure.

Next, add a line, identified as L in FIG. 22, extending from one corner or vertex 1004 to a point 1010 that is at distance x above the base and along the tentpole in such a way that this point 1010 will fit the definition of thae middle or volumetric center 1010 of the tetrahedron:

Now, we calculate a value of x in two different ways and set them equal to each other to yield a numerical value for x:

$$x^2 = L^2 - (s^2)/3 = (D-L)^2 = [s*\text{sqrt}(2/3) - L]^2$$

$$L^2 - (s^2)/3 = s^2*(2/3) + L^2 - 2sL\ \text{sqrt}(2/3)$$

$$-s^2 = -s2L\ \text{sqrt}(2/3)$$

$$s = 2\ L\ \text{sqrt}(2/3) = L*\text{sqrt}(8/3)$$

$$L = s*\text{sqrt}(3/8)$$

Therefore, $$X = \text{sqrt}[L^2 - (s^2)/3] = \text{sqrt}[(s^2)(3/8) - (s^2)/3] = s*\text{sqrt}(3/8 - 1/3) = s*\text{sqrt}(9/24 - 8/24) = s*\text{sqrt}(1/24)$$

Figure 23:
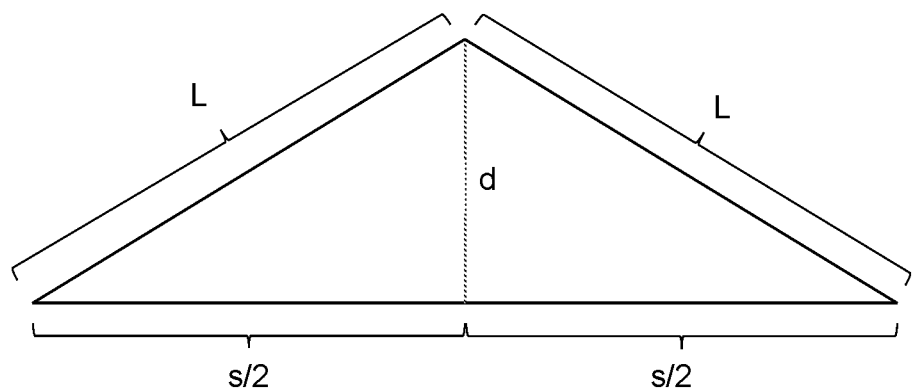
FIG. 23 illustrates a portion of view of FIG. 22 reoriented for clarity of illustration and calculations description as described in this disclosure.

Now, as illustrated in FIG. 23, the diameter (d) of the spherical trim to be applied to the equilateral tetrahedron to arrive at the tetrahedral modeling device according to above disclosure in relation of FIGS. 4A and 4B can be calculated as the distance from this volumetric center 1010 of the equilateral tetrahedron to the midpoint of a side 1002 of length s:

$$d = \text{sqrt}(L^2 - s^2/4) = s*\text{sqrt}(3/8 - 1/4) = s*\text{sqrt}(1/8)$$

To summarize, for the tetrahedron of side s,

L=distance from volumetric center 1010 to one vertex 1004=$s*\text{sqrt}(3/8)$ d=distance from center 1010 to midpoint of one side 1002 of length $s = s*\text{sqrt}(1/8)$ x=distance from center 1010 to midpoint 1006 of one face=$s*\text{sqrt}(1/24)$ R=distance between volumetric centers of two tetrahedrons coupled to one another at respective faces. R equals $2X = s*\text{sqrt}(1/6)$ To locate the volumetric center 1010 of the tetrahedron, start at the midpoint of one side 1002 of length s of the base face and extend a perpendicular bisector towards the opposite corner or vertex 1004 for a distance of $B = s/[2(\text{sqrt}3)] = s*\text{sqrt}(1/12) = s*(0.288675135)$ (FIG. 20). From this point, extend a line perpendicular to the base face up into the body of the tetrahedron towards the opposite vertex 1004 for a distance of $x = s*\text{sqrt}(1/24) = s*(0.204124145)$ (FIG. 22). The distance from this new point (the volumetric center) to each of the four corners or vertices 102 (FIGS. 1, 4A, and 4B) of the modeling device 100 will be:

$$s*\text{sqrt}(3/8) = s*(0.612372436)$$

The radius 110 (FIG. 4B) of the truncating sphere or spherical periphery (FIG. 4B) is therefore:

$$s*\text{sqrt}(1/8) = s*(0.353553391)$$

And the distance between the centers of two tetrahedrons that are tightly apposed and linked at their faces will be:

$s*\mathrm{sqrt}(1/6)=s*(0.40824829)$

Scaling Factors:

By way of example, if one designs a tetrahedron with the following characteristics:

Distance between the centers of adjacent linked tetrahedrons=1 centimeter

This yields the following calculation for s:

$s*\mathrm{sqrt}(1/6)=1$ or $s=1/(\mathrm{sqrt}(1/6))=2.449489743$

The sphere size of this tetrahedron will have a diameter of:

$2*s*\mathrm{sqrt}(1/8)=1.732050808$ cm=sqrt(3)

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A modeling apparatus comprising:
a plurality of modeling devices coupleable to each other to form the modeling apparatus, each modeling device including,
a truncated tetrahedron defining a volume formed by truncating a regular tetrahedron having a center point, four vertices regions, and six equal edges each having a midpoint, by removing the four vertices regions, each vertices region defined by symmetrically intersecting the regular tetrahedron with a spherical periphery having a center coincident with the center point and a radius equal to a distance from the center point to the midpoint of one of the edges, the resulting truncated tetrahedron having four curvilinear corners each having a radius equal to the radius of the spherical periphery, and four flat faces each face having a circular periphery and contacting each of the other three faces at respective points between the curvilinear corners at the midpoint of the respective edges, each curvilinear corner being bound by one quarter of the circular periphery of three adjacent faces;
four linking members respectively fixedly coupled to each face of the truncated tetrahedron at the central region thereof, at least one of the linking members fabricated from a magnet and the other three linking members fabricated from a material selected from a group consisting of a magnet, a magnetically attractable material, and a neutral material, each magnet coupled to expose only one of a positive polarity and a negative polarity on the corresponding face,
the modeling devices being configurable to be coupled and assembled to exhibit,
a generally planar surface formed by an alternating pattern of a plurality of faces and curvilinear corners of respectively coupled modeling devices, each curvilinear corner having an apex between the faces, the faces being coplanar with the apex of the curvilinear corners, and
a pattern of a plurality of modeling devices coupled in a circular array, the curvilinear corners of each modeling device contiguous and in contact with the curvilinear corner of adjacent modeling devices, forming a closed non-porous assembly.

2. The apparatus of claim 1 wherein the linking members exert a force perpendicular to the corresponding face to which each linking member is coupled.

3. The apparatus of claim 1 wherein a first group of the linking members are fabricated from magnets, and a second group of linking members are fabricated from a material selected from a group consisting of a magnet and a magnetically attractable material, the linking members of the first group exhibiting a magnetic force having a magnitude when coupled to one of the linking members of the second group, the magnitude of the force of exhibited by at least two of the linking members in the first group varying from each other when respectively coupled to one of the linking members of the second group.

4. The apparatus of claim 1 wherein selectively moving of at least one modeling device imparts motion to at least some of the other modeling devices.

5. The apparatus of claim 1 wherein the plurality of modeling devices are coupled in a first relational arrangement, forming a first unitary body, the same plurality of modeling devices being selectively movable between the first relational arrangement and a second relational arrangement while remaining unitary, the modeling devices in the second relational arrangement being arranged relative to each other different from the first relational arrangement and forming a second unitary body different from the first unitary body.

6. The apparatus of claim 1 wherein at least two of the modeling devices have distinct sizes.

7. The apparatus of claim 1, further comprising:
an actuating device operatively coupled to at least one of the modeling devices and configured to impart motion thereto.

8. The apparatus of claim 1 wherein the plurality of modeling devices are rotatably coupled with respect to adjacent modeling devices, forming a unitary body, the apparatus remaining unitary when the modeling devices are selectively rotated.

* * * * *